United States Patent
Moore

(10) Patent No.: US 11,610,015 B2
(45) Date of Patent: Mar. 21, 2023

(54) MANAGING GROUP AUTHORITY AND ACCESS TO A SECURED FILE SYSTEM IN A DECENTRALIZED ENVIRONMENT

(71) Applicant: SPIDEROAK, INC., Lenexa, KS (US)

(72) Inventor: Jonathan Andrew Crockett Moore, Portland, OR (US)

(73) Assignee: SpiderOak, Inc., Lenexa, KS (US)

( * ) Notice: Subject to any disclaimer, the term of this patent is extended or adjusted under 35 U.S.C. 154(b) by 58 days.

(21) Appl. No.: 17/362,617

(22) Filed: Jun. 29, 2021

(65) Prior Publication Data
US 2021/0326468 A1    Oct. 21, 2021

Related U.S. Application Data

(60) Division of application No. 17/156,273, filed on Jan. 22, 2021, now Pat. No. 11,138,331, which is a (Continued)

(51) Int. Cl.
*G06F 21/62* (2013.01)
*H04L 9/40* (2022.01)
(Continued)

(52) U.S. Cl.
CPC ........ *G06F 21/6218* (2013.01); *H04L 9/0643* (2013.01); *H04L 9/08* (2013.01);
(Continued)

(58) Field of Classification Search
CPC .... G06F 21/6218; G06F 21/602; G06F 21/64; H04L 9/0643; H04L 9/08; H04L 9/0841;
(Continued)

(56) References Cited

U.S. PATENT DOCUMENTS 9,397,990 B1    7/2016  Taly et al.
9,736,145 B1    8/2017  Hayes et al.
(Continued)

OTHER PUBLICATIONS

Arnar Birgisson et al., "Macaroons: Cookies with Contextual Caveats for Decentralized Authorization in the Cloud," NDSS'14, Internet Society, 2014, 16 pgs.
(Continued)

*Primary Examiner* — Baotran N To
(74) *Attorney, Agent, or Firm* — Perkins Coie LLP

(57) ABSTRACT

Presented here is a system that manages secured file system, and an authority to the secured file system, by granting access only to a user who is authorized to access the file system. The user within the system is identified using a unique key unique to each user. The user's authority is recorded in a linear sequence distributed among multiple devices each of which independently verifies the validity of each block in the linear sequence. The validity of the linear sequence is guaranteed by preventing certain operations from being performed on the linear sequence, such as branching of the linear sequence, deletion, and modification of the blocks within the linear sequence. Prior to adding a new block to the linear sequence, the validity of the block is independently computed by each of the devices.

30 Claims, 17 Drawing Sheets

Related U.S. Application Data continuation of application No. 16/709,509, filed on Dec. 10, 2019, now Pat. No. 11,341,259.

(60) Provisional application No. 62/830,002, filed on Apr. 5, 2019, provisional application No. 62/778,633, filed on Dec. 12, 2018.

(51) Int. Cl.
  *H04L 9/32* (2006.01)
  *H04L 9/08* (2006.01)
  *H04L 9/06* (2006.01)
  *H04L 9/00* (2022.01)

(52) U.S. Cl.
  CPC .......... *H04L 9/0841* (2013.01); *H04L 9/3226* (2013.01); *H04L 63/102* (2013.01); *H04L 9/50* (2022.05)

(58) Field of Classification Search
  CPC ....... H04L 9/3226; H04L 63/102; H04L 9/50; H04L 63/0435; H04L 63/065; H04L 63/104; H04L 9/3239
  See application file for complete search history.

(56) References Cited

U.S. PATENT DOCUMENTS

| | | | |
|---|---|---|---|
| 10,325,257 | B1 | 6/2019 | Winklevoss |
| 10,742,397 | B2* | 8/2020 | Callan ................ H04L 9/3249 |
| 11,138,331 | B2* | 10/2021 | Moore ................ H04L 9/3226 |
| 11,251,963 | B2 | 2/2022 | Wei et al. |
| 11,252,166 | B2 | 2/2022 | Wei et al. |
| 11,341,259 | B2* | 5/2022 | Moore ................ G06F 21/6218 |
| 11,403,417 | B2* | 8/2022 | Moore ................ G06F 21/602 |
| 2016/0259936 | A1 | 9/2016 | Mukherjee et al. |
| 2017/0046638 | A1 | 2/2017 | Chan et al. |
| 2017/0091397 | A1 | 3/2017 | Shah |
| 2017/0243209 | A1 | 8/2017 | Johnsrud et al. |
| 2017/0366348 | A1 | 12/2017 | Weimer et al. |
| 2018/0060496 | A1 | 3/2018 | Bulleit et al. |
| 2018/0189732 | A1 | 7/2018 | Kozloski et al. |
| 2018/0288031 | A1 | 10/2018 | Kumar |
| 2018/0316676 | A1 | 11/2018 | Gilpin |
| 2019/0190724 | A1 | 6/2019 | Sundaresan et al. |
| 2019/0197532 | A1 | 6/2019 | Jayachandran et al. |
| 2019/0311337 | A1 | 10/2019 | Madisetti et al. |
| 2019/0334700 | A1 | 10/2019 | Callan et al. |
| 2019/0370760 | A1 | 12/2019 | Kandu et al. |
| 2019/0394113 | A1 | 12/2019 | Huang |
| 2020/0004442 | A1 | 1/2020 | Caswell et al. |
| 2020/0021589 | A1 | 1/2020 | Smith et al. |
| 2020/0050686 | A1 | 2/2020 | Kamalapuram et al. |
| 2020/0067907 | A1 | 2/2020 | Avetisov et al. |
| 2020/0084027 | A1 | 3/2020 | Duchon et al. |
| 2020/0193047 | A1 | 6/2020 | Moore |
| 2020/0218795 | A1 | 7/2020 | Antar et al. |
| 2020/0320211 | A1 | 10/2020 | Moore |
| 2020/0336299 | A1* | 10/2020 | Callan ................ G06F 16/1834 |
| 2021/0073212 | A1 | 3/2021 | Conley et al. |

OTHER PUBLICATIONS

PCT/US2021/023633 International Search Report and Written Opinion dated Aug. 18, 2021, 16 pgs.

* cited by examiner

MANAGING GROUP AUTHORITY AND ACCESS TO A SECURED FILE SYSTEM IN A DECENTRALIZED ENVIRONMENT

CROSS-REFERENCE TO RELATED APPLICATIONS

The present application is a divisional of U.S. patent application Ser. No. 17/156,273 filed Jan. 22, 2021, which is a continuation of U.S. patent application Ser. No. 16/709,509, filed Dec. 10, 2019, which claims priority to and benefit of U.S. Provisional Patent Application Nos. 62/778,633, filed Dec. 12, 2018 and 62/830,002, filed Apr. 5, 2019, each of which is hereby incorporated by reference in its entirety.

TECHNICAL FIELD

The present application is related to managing access to a secured file system, and more specifically, to methods and systems that manage group authority and access to the secured file system in a decentralized environment.

BACKGROUND

The major problem our computing systems face today is that internal threats—that is, threats from our reliance upon a centralized infrastructure and the people that manage and provide it—are a part of the overall threat model. According to Microsoft SharePoint Admin Role documentation, "[g]lobal admins and SharePoint admins don't have automatic access to all sites and each user's OneDrive, but they can give themselves access to any site or OneDrive." Our current approach to infrastructure, that centralizes the management and provision of security and access control with admins allows people access to information without a need-to-know that information. As a result, administrators that do not have the authority to read data stored on the server that they are administering can still gain access and read the data, without the authority to do so.

SUMMARY

Presented here is a system that manages file system, and an authority to access the file system, by granting access only to a user who is authorized to access the file system. Access granted to the user cannot exceed the authority of the user. The user within the system is identified using a cryptographic key unique to each user. The user's authority is recorded in a linear sequence, akin to a block chain, which is distributed among multiple devices. Each of the multiple devices independently verifies the validity of each block in the linear sequence, thus preventing a compromised central server from granting unauthorized access. The validity of the linear sequence is guaranteed by preventing certain operations from being performed on the linear sequence, such as branching of the linear sequence, deletion of the blocks within the linear sequence, and modification of the blocks within the linear sequence. Prior to adding a new block to the linear sequence, the validity of the block is independently computed by each of the devices in the system to ensure that the user requesting the addition of the block has the authority to add the block to the linear sequence, and more specifically, to perform the operation specified by the contents of the block.

DETAILED DESCRIPTION

Figure 1:
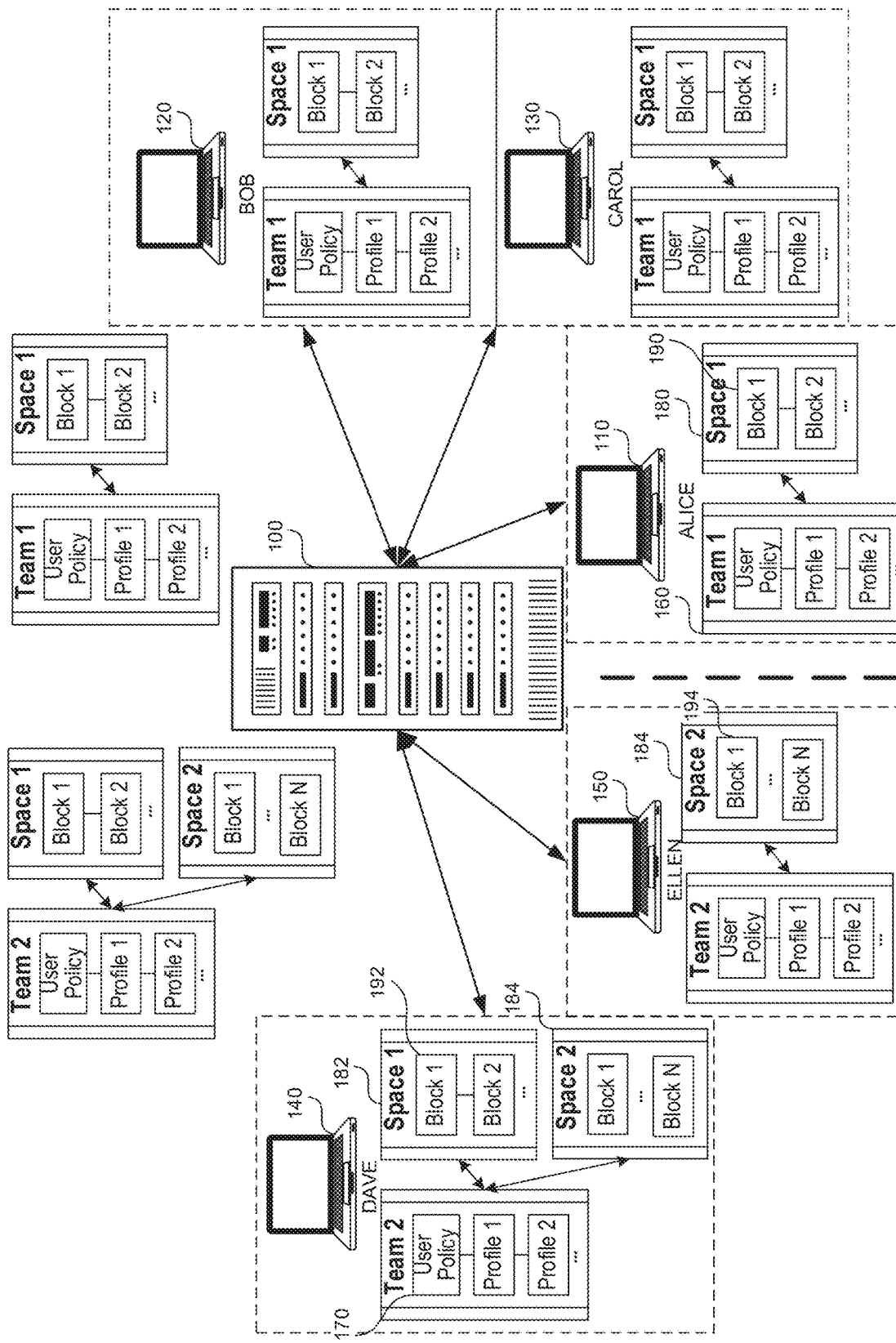
FIG. 1 shows a system to manage group authority and access to cryptographically secure data in a decentralized environment.

Managing Group Authority and Access to Secure Data in a Decentralized Environment FIG. 1 shows a system to manage group authority and access to cryptographically secure data in a decentralized environment. The server 100 is in communication with multiple devices 110, 120, 130, 140, 150, also called endpoints. Each of the devices 110-150 can be associated with an entity or a user such as Alice, Bob, Carol, Dave, Ellen, respectively. Each user Alice-Ellen can have a unique cryptographic user identification ("ID"), as explained later in this application, and each device can have a unique cryptographic device ID. Each cryptographic user ID can have one or more cryptographic device IDs associated with it.

The unique cryptographic user IDs can be separated into teams, such as team 1 and team 2 as shown in FIG. 1. For example, Alice's, Bob's and Carol's cryptographic user IDs can be members of team 1, while Dave's and Ellen's cryptographic user IDs can be members of team 2, as shown in FIG. 1. Team 1 and team 2 can have mutually exclusive membership, as shown in FIG. 1, or can have partially overlapping membership. The team membership can be recorded in a linear sequence, for example, a team linear sequence 160, 170 (only one instance of a team linear sequence labeled for brevity). Each team 1, 2 can have one team linear sequence 160, 170, respectively. The linear sequence, such as the team linear sequence 160, 170 and a space linear sequence 190, 192, 194, is a cryptographic data structure akin to a ledger. Because the linear sequence can be distributed across multiple devices, each of which independently verifies the linear sequence, the linear sequence can represent a distributed ledger.

Each team 1, 2 can have one or more spaces 180, 182, 184 (only one instance of a space labeled for brevity). Each space 180, 182, 184 can be a virtual compartment containing encrypted data and members having access to the encrypted data. A subset of team members can be included in one or more spaces 180, 182, 184 and given authority to access encrypted data associated with the one or more spaces 180, 182, 184. For example, team 1 has space 180, and all the team members Alice, Bob and Carol are invited to space 180. In another example, team 2 has space 182 and 184. Space 182 only has Dave as a member, while space 184 has both Dave and Ellen as members. Each space 180, 182, 184 can have encrypted data that can be made accessible only to the space members. Encrypted data can include content or data, or both. For example, encrypted data can include a file, a file system, a document, and/or messages such as instant messages, emails, chat messages, text messages, etc.

In an example, only users Alice, Bob, Carol have authority to the encrypted data associated with space 180. In another example, only user Dave has the authority to the encrypted data associated with the space 182, while both users Dave and Ellen have the authority to access encrypted data associated with space 184. Authority to the encrypted data can include permission to read, write, and/or modify the encrypted data. Access to encrypted data can be granted upon verifying that the cryptographic user ID requesting the access has the authority encompassing the access.

For example, user Ellen's cryptographic user ID can have the authority to read the encrypted data. However, if user Ellen's cryptographic user ID requests to write to the encrypted data, user Ellen's cryptographic user ID will be denied the access to write to the encrypted data because user Ellen's cryptographic user ID lacks the authority. In other words, in the system disclosed here, the access to the encrypted data cannot exceed the authority associated with the encrypted data.

In another embodiment, the teams 1, 2 do not exist, and the users can be grouped into one or more spaces 180, 182, 184. To generate a space, a general pool of cryptographic user IDs that exist in the system can be searched to define the members of the space. The team linear sequence 160, 170 can be integrated into the corresponding space linear sequence 190, 192, 194 (only one instance of a space linear sequence labeled for brevity). For example, the space linear sequence 190 can include the team linear sequence 160 and the space linear sequence 192, the space linear sequence 192 can include the team linear sequence 170 and the space linear sequence 192, while the space linear sequence 194 can include the team linear sequence 170 and the space or list 194.

A record of the authority associated with the encrypted data can be computed by combining the team linear sequence 160, 170 and a corresponding space linear sequence 190, 192, 194, as described further in this application. In addition to storing authority and membership, the space linear sequence 190, 192, 194 can also store the encrypted data and/or references to the encrypted data.

A copy of the team linear sequence 160, 170 and the space linear sequence 190, 192, 194 can be distributed to all the devices 110-160 whose cryptographic user IDs are members of the corresponding team and space as well as the server 100. For example, devices 110-130 have a copy of the team linear sequence 160 and the space linear sequence 190 because the cryptographic user IDs associated with the devices 110-130 are members of team 2 and space 180. In another example, device 140 has a copy of the team linear sequence 170 and space linear sequences 192 and 194, because user Dave's cryptographic user ID associated with the device 140 is a member of team 2 and space 182, 184. In a third example, device 150 has a copy of the team linear sequence 170 and space linear sequence 194, because user Ellen's cryptographic user ID associated with device 150 is a member of team 2 and space 184.

The metadata contained in the team linear sequence 160, 170 and the space linear sequence 190, 192, 194 can be stored in plain text, while the remainder of the data can be encrypted. The metadata can include authority information, policy information, roles, etc., stored within the team linear sequence 160, 170 and the space linear sequence 190, 192, 194. The remainder of the data can include confidential data such as files, filesystems, messages, and/or other confidential data. For example, filenames can be a part of the confidential data if the encrypted data includes files and/or filesystems. The filesystems, files, and/or messages can only be accessed by knowing the encryption key used in encrypting the data. Even if an attacker were to successfully gain control of the encryption key, a user's private key, and/or authorized endpoint device, the compromise of the system would be limited.

For example, if the attacker gains control of the encryption key associated with space 182, the attacker would only be able to access confidential data within the space 182, not the confidential data within spaces 184 and 180. If an attacker obtains Ellen's private key, the attacker would only be able to access confidential data within the space 184, and not spaces 180 and 182. Thus, by compartmentalizing authority and access to spaces 180, 182, 184, the breach of the system can be confined.

Figure 2:
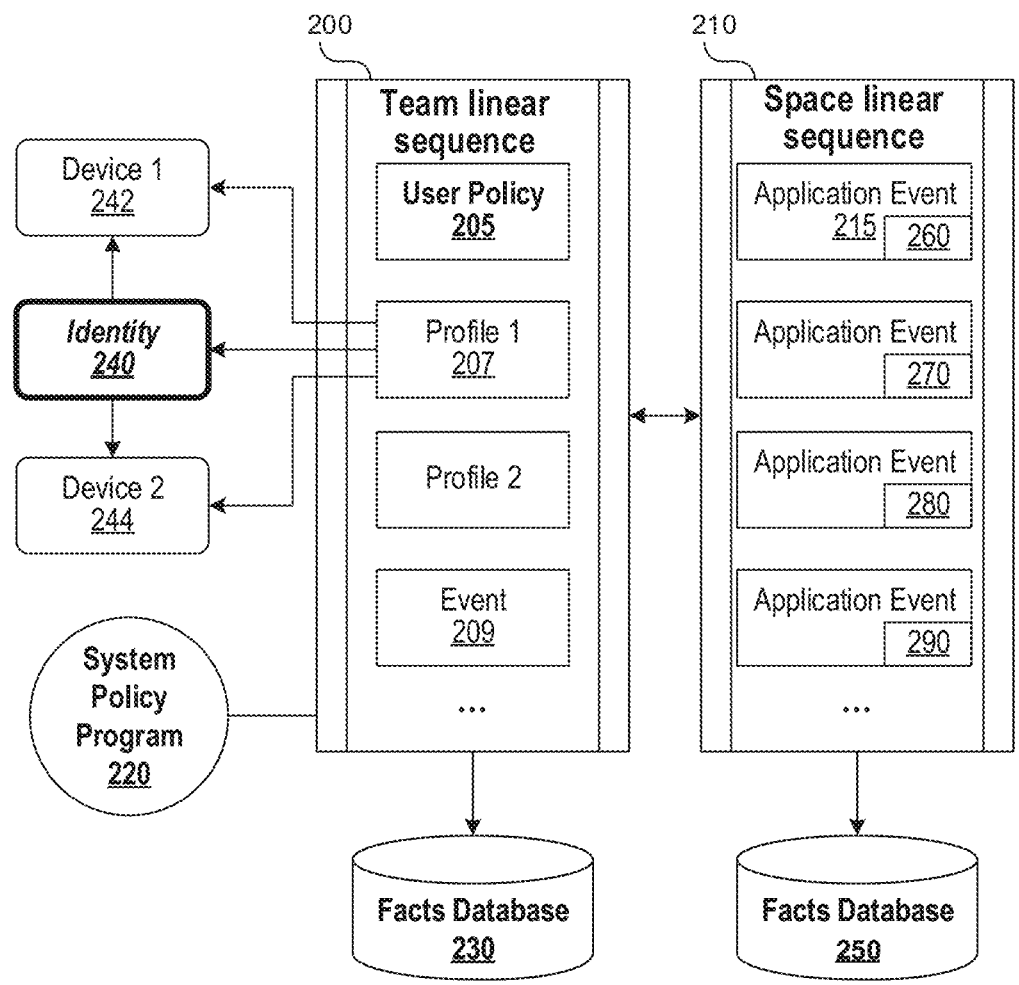
FIG. 2 shows a team linear sequence and a space linear sequence.

FIG. 2 shows a team linear sequence and a space linear sequence. A team linear sequence 200 can be used to track identities of team members and their authority in a team. A space linear sequence 210 can be used to form a secure compartment which can admit a subset of the team members. The secure compartments are used to manage data and negotiate shared keys among the space members. The team linear sequence 200 can be connected to a program 220 containing a system policy, as well as to a database 230 containing facts. The space linear sequence 210 can rely on the team linear sequence 200 to determine policy within the space. The space linear sequence 210 can be connected to a database 250 containing facts.

The team linear sequence 200 and the space linear sequence 210 can each contain multiple blocks 205, 207, 209, 215 (only 4 labeled for brevity). The initial block 205 of the team linear sequence 200 can define a policy for the team. A policy can specify a role and an authority associated with the role. For example, a policy can specify "only administrators can create spaces within a team." A team policy can be obtained from a policy template stored in a policy database and/or can be modified when instantiating the first block 205. Alternatively, the first block 205 can define the team policy without reference to the policy template. A policy program 220 can be shared between different teams. The different teams, however, can have different fact databases 230. The team policy can also be modified by later blocks added to the team linear sequences 200, if the team policy defining block 205 permits modification.

The policy program 220 can store policy templates that can be included and/or modified as policy in the initial block 205. The fact database 230 can contain unique key-value pairs that can define user and user authority within the system. For example, a key-value pair that can be added to the fact database 200 can be "Alice-administrator", after a block that specifies that Alice is an administrator has been verified.

Block 207 of the team linear sequence 200 can include a profile of the user that is a member of the team 200. The user profile can include the user's identity 240 which can be represented by a cryptographic user ID, such as a public-key in an asymmetric cryptographic algorithm such as Rivest-Shamir-Adleman (RSA) or Diffie Hellman (DH). Only the user can be in possession of the private-key. The user profile can also include a cryptographic device ID 242, 244 associated with all the devices that the user has approved.

There are multiple ways that a device can be added to the system. For example, the user can approve the device by sending a request to add the device to the system, where the request is signed with a private key of the user. In another example, to approve a device, the user can perform a multi-step process. In the first step, the user can create a new set of device keys using the asymmetric cryptographic algorithm. In the second step, the user can sign the device keys with the user's private key and construct a device certificate containing the device public-key and the user's private key signatures. In the third step, the device can send a request, which includes the certificate from the second step, to be added to the team, where the request is signed using the device private key. The system can authenticate that a team member has made the request by verifying the request using the public-key of the user. The cryptographic device ID can be a cryptographic hash of the public-key of the asymmetric cryptographic algorithm, while the private-key can be known only to the device and can be used to authenticate actions performed by the device.

Block 209 of the team linear sequence 200 can include an event such as addition of a new user, creation of the space linear sequences 210, a change to policy 205, removal of an existing user, and/or a change of role of a user.

Block 215 of the space linear sequence 210 can include an event such as addition of a user to the space, addition of encrypted data to the space, removal of a user from space, etc. Each event 215 in the space linear sequence 210 complies with the policy defined in the team linear sequence 200. In some embodiments, policy cannot be changed in the space linear sequence 210 and must be changed in the team linear sequence 200. A team can have multiple spaces with different policies by defining multiple space types having different policies, and establishing the spaces corresponding to the different space types. For example, a space type can include an "administrator space type" where all users have administrator roles and administrators add and remove other users and can have read and write access to the encrypted data. In another example, the space type can include "stratified space type" where some users have administrator roles, and some users have user roles, and the administrator roles have more authority than the user roles. Events in the team linear sequence 210 that change authority of a user can be stored in the fact database 250.

User policy 205 can be defined to enable users matching certain attributes to only have access to the space linear sequence 210 and space encrypted data for a limited amount of time. The passage of time can be measured by an always increasing clock that can provide a timestamp 260, 270, 280, 290 for each block 215 in the space linear sequence 210. The timestamp 260 can, for example, state "11:46 AM Nov. 21, 2019 (PST)." In the space linear sequence 210, the timestamp 260, 270, 280, 290 is always increasing between subsequent blocks. To enable time-limited access to the space linear sequence 210 and associated encrypted data, the user policy 205 can state that "user associated with profile 1 can have access to the linear sequence until Dec. 2, 2019."

Figure 3:
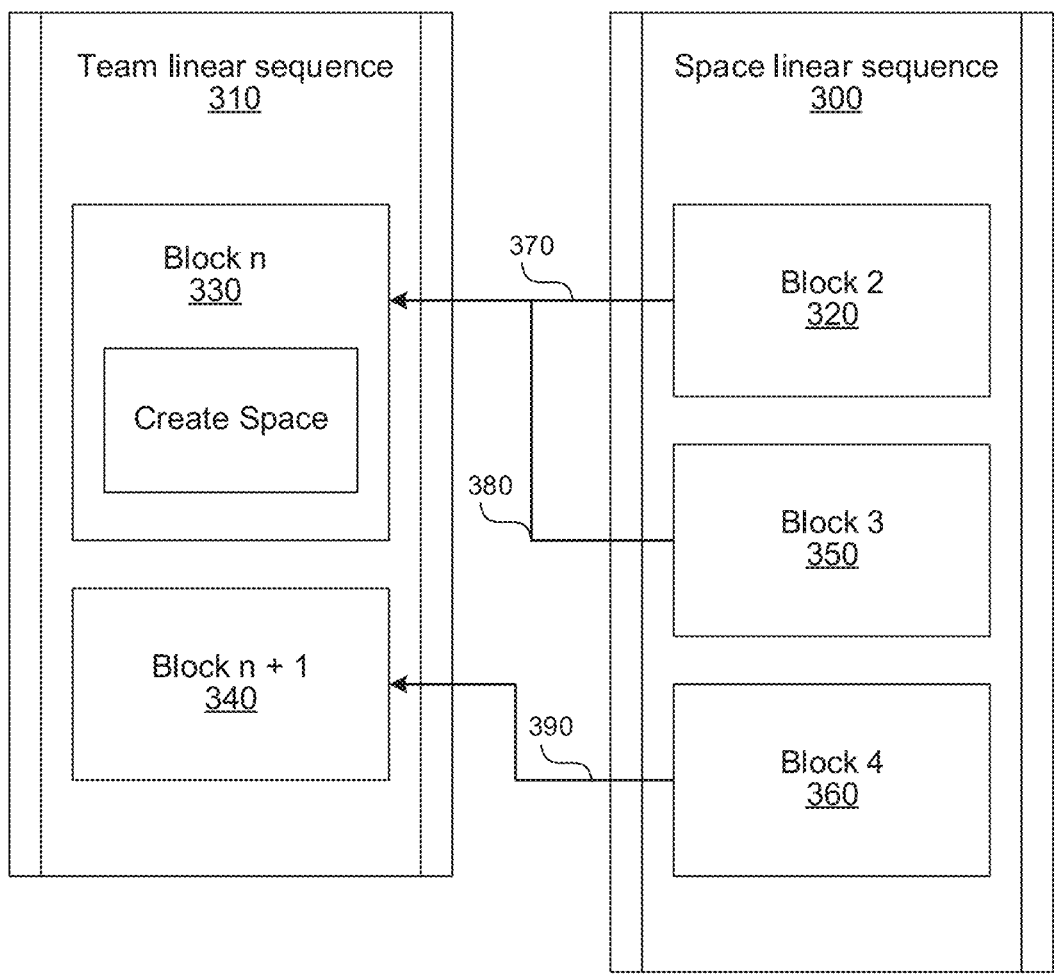
FIG. 3 shows the linear ordering between a team linear sequence and a space linear sequence.

FIG. 3 shows the linear ordering between a team linear sequence and a space linear sequence. Because the policy at least partially defining authority is stored in the team linear sequence 310, to compute an authority in a space linear sequence 300, a reference to the team linear sequence 310 needs to be made.

For example, in block 320 of the space linear sequence 300, the user of the space requests to add another user. In block 330 of the team linear sequence 310, the policy defined authority of the space user to add another space user, however in block 340 of the team linear sequence 310, the policy was modified to prevent space users from adding others space users. To determine whether block 320 is valid and should be added to the space linear sequence 300, the linear sequence of blocks 330, 340 in the team linear sequence 310 and the blocks 320, 350, 360 in the space linear sequence 300 needs to be established.

To establish the linear sequence, a temporal relationship 370, 380, 390 can be established between the blocks 320, 350, 360 in the space linear sequence 300 and the blocks 330, 340 in the team linear sequence 310. The temporal relationship 370, 380, 390 can include a pointer from the space block 320, 350, 360 to the team block which is the immediate predecessor or immediate successor of the space block 320, 350, 360. In FIG. 3, the temporal relationships 370, 380, 390 point from the space block 320, 350, 360 to the immediately preceding team block. For example, temporal relationship 370, 380 indicates that the team block 330 is the immediate predecessor of space blocks 320, 350, meaning that space blocks 320, 350 were created after the team block 330, but before team block 340. Similarly, the temporal relationship 290 indicates that space block 360 was created after team block 340.

Figure 4:
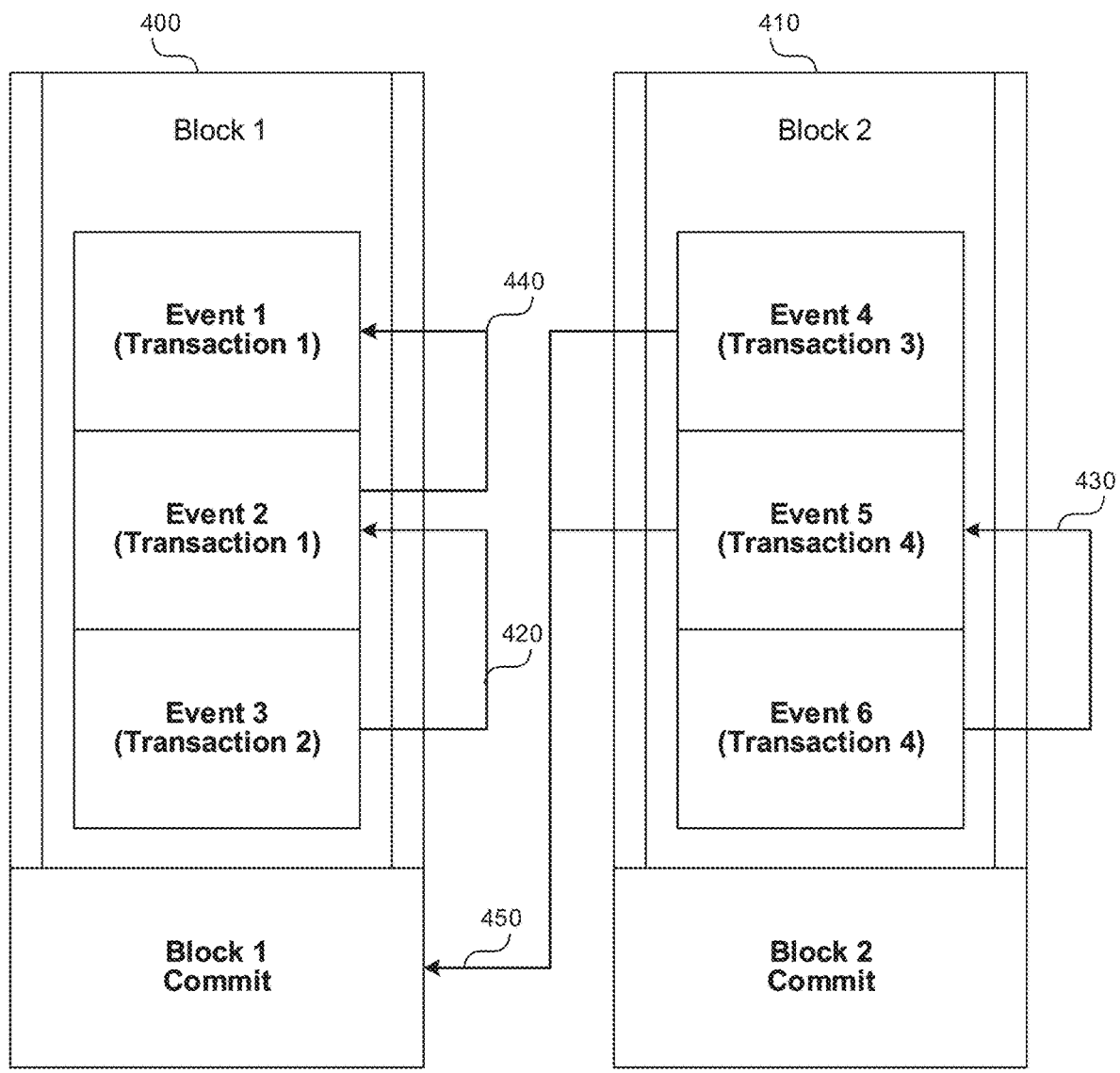
FIG. 4 shows anatomy of a block.

FIG. 4 shows anatomy of a block. The block 400, 410, can contain one or more events 1-6. The events 1-6 in blocks 400, 410 can be atomic. Each event 1-6 is committed in a single block 400, 410.

A transaction can include one or more events where the last event is signed. A transaction can be produced by a single client, such as client 110 in FIG. 1. When a transaction includes multiple events, such as transaction 1 containing events 1 and 2, the events can be ordered by the client prior to being sent to the server. The ordering of the events is indicated using arrows 420, 430, 440, 450. Upon receiving transactions 1-4 from multiple clients, the server can order transactions according to the order indicated by the arrows 420, 430, 440, 450.

Events in a single transaction point to each other, and the last event is signed. For example, events 1 and 2 form a single transaction 1. Similarly, events 5 and 6 form a single transaction 4. The arrow 420 between event 3 and event 2, indicates that a server should commit event 3 to the linear sequence after event 1. Similarly, the arrow 430 between events 5 and 6 indicates that the server should commit the event 6 to the linear sequence after event 5.

In an embodiment, events 1 and 2 come from a single client, while event 3 can come from the same client as events 1 and 2, or from a different client. Similarly, events 5 and 6 come from a single client, while event 4 can come from the same client or a different client. Further to this embodiment, there can be at least one and up to four clients creating transactions 1-4, as shown in FIG. 4. For example, a single client can author transaction 1, including events 1 and 2. A second client can author transaction 2 including event 3. A third client can author transaction 3 including event 4, and a fourth client can author transaction 4 including events 5 and 6.

In the case that more than one event, for example, events 1-3, need to be added in an atomic manner, the events 1-3 can be combined into a single block 400, and the block 400 can be stored in the linear sequence. In the block 400, 410, only the last event, such as event 3, 6, respectively, can be signed and none of the events 1-3, 4-6 in the block 400, 410 are valid unless they all appear in the intended order in the intended block.

The events 1-6 in blocks 400, 410 are cryptographically signed and recorded in an authenticated linear sequence, as explained in this application. The structure of the linear sequences guarantees that devices 110-160 in FIG. 1, which accept a block with some index n, are certain to agree on the contents of all blocks with an index less than n. Blocks 400, 410 have indices 1, 2, respectively, in FIG. 4.

Once the block 400, 410 is finalized, the block 400, 410 gains a block ID. Finalizing a block means committing a block to a durable storage and not changing the block. A block ID is a tuple of the block's index, and the cryptographic hash of its contents. For a given block n, all events intended to be added to the linear sequence in block n+1 can include block ID of block n. This ensures that the intended ordering of events of devices 110-160 is preserved. Additionally, only devices which agree on the block order and contents of blocks 0 through n, can accept an event in block n+1.

Figure 5:
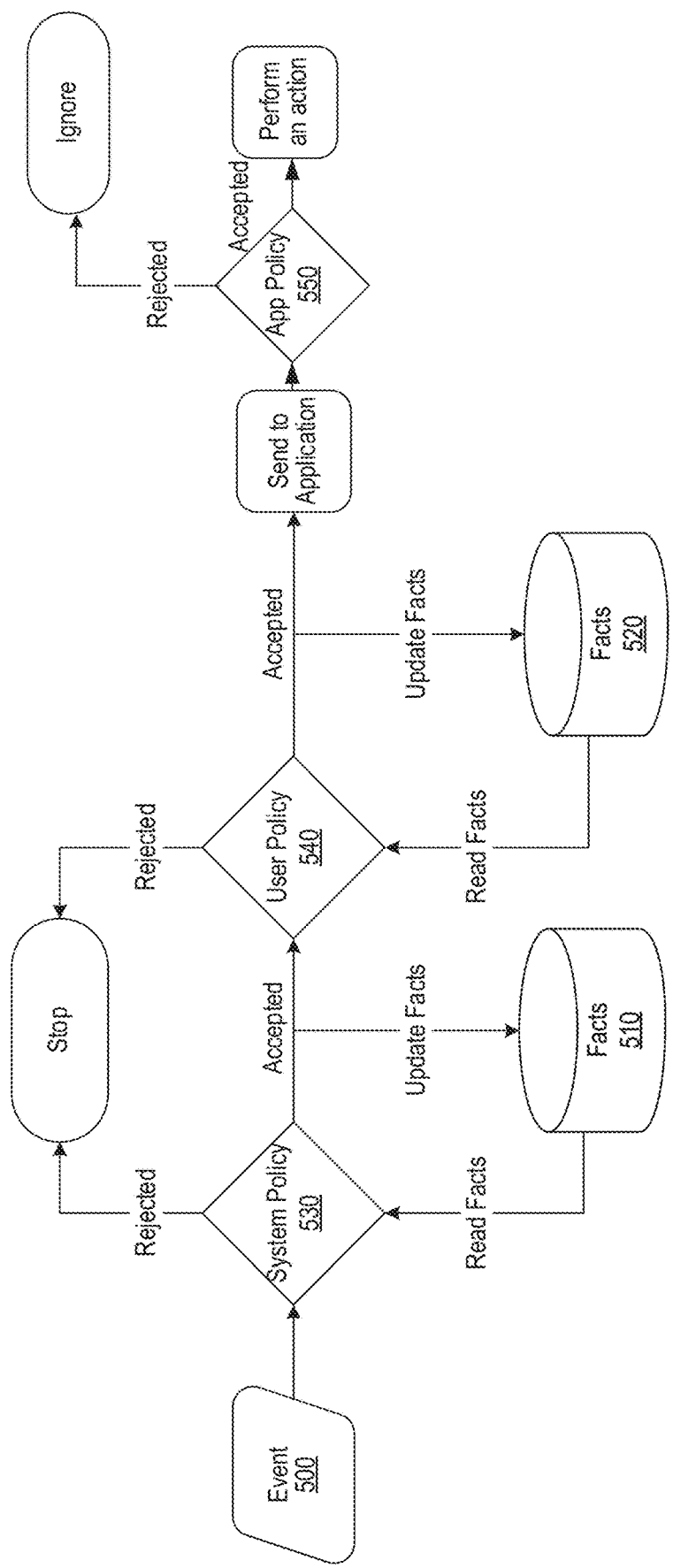
FIG. 5 shows verification of various layers of policies that can exist within the system.

FIG. 5 shows verification of various layers of policies that can exist within the system. An events 500 is processed using a formal policy which may either reject an event 500 or accept an event 500, and optionally update a database of facts 510, 520. A fact database 510, 520 is an index over the linear sequence with respect to the policy. The index is a collection of key value pairs. For example, the fact database 510, 520 can record facts generated by the event 500 and the policy rule which authorized it. The fact database 510, 520 can be read by a policy pressor when deciding if the event 500 is valid and should be accepted in the linear sequence, such as a team linear sequence, or a space linear sequence.

When a server 100 in FIG. 1 receives the event 500, the server can include the event 500 in the next block. When the device 110-160 receives the event 500, the device can process the event 500 based on the business needs.

The system policy 530 is implemented by the device 110-160 and server 100. All cooperating devices 110-160 must use the same system policy 530 when processing the same block. In one embodiment, system policy 530 can be implemented as source code in a programming language such as Rust, Python, Go, or a proprietary policy language. The system policy 530 describes the structure of the blocks themselves. The system policy 530 describes the core protocol of the linear sequences, such as "all events in block n must reference block n-1."

The user policy 540 can be the team policy 205 in FIG. 2. The team policy 205 can be provided by a customer and can be tailored to the customer's organization. To ensure that all parties agree on the user policy 540, the user policy 540 can be stored in the linear sequence, such as the team linear sequence 310 in FIG. 3, and is guaranteed to be the same for all users cooperating on a particular linear sequence. An example of a team policy rule is "only team admins can add new members to a team."

The application policy 550 can be defined per team 160, 170 in FIG. 1. The key difference between the application policy and other policies is that the application policy operates after any cyphertext has been decrypted. Consequently, the application policy cannot be checked by the server. The application policy may not record authority, and can specify low level rules such as "two files cannot have the same name." The application policy 550 can encode rules to resolve low-level conflicts such as "if two files have the same name, the second file is ignored." Policies, including the system policy 530, the user policy 540 and/or the application policy 550, can be fixed in the program or managed using the linear sequences, such as team linear sequence 200 and space linear sequence 210 in FIG. 2.

Figure 6:
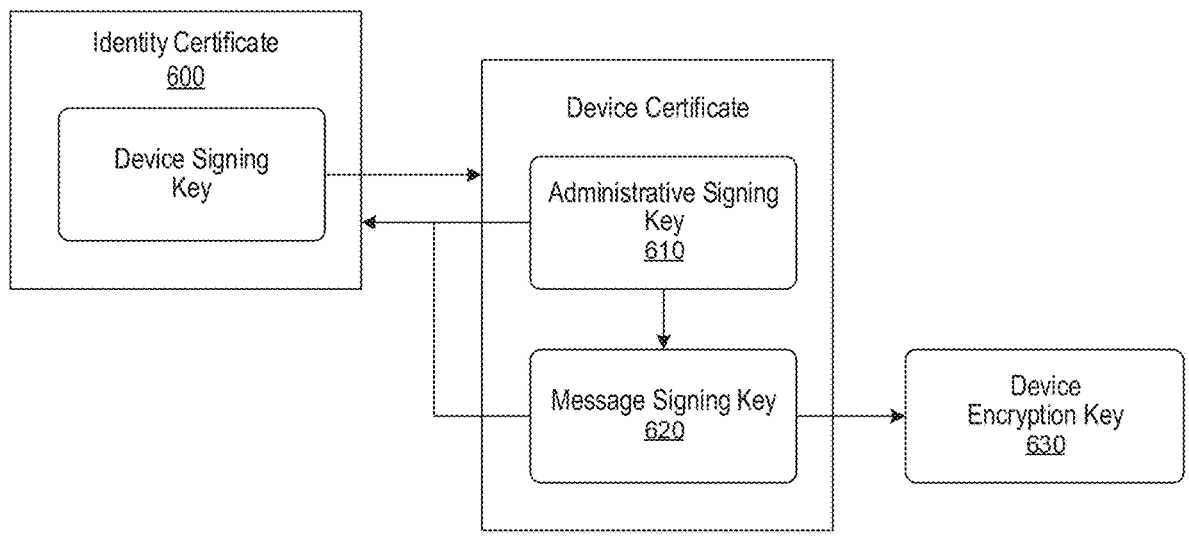
FIG. 6 shows various cryptographic IDs that can exist within the system.

FIG. 6 shows various cryptographic IDs that can exist within the system. Identities form the foundation of the security. Identities are represented by cryptographic identification (ID), such as asymmetric key pairs generated off-line using RSA, DH or other asymmetric algorithms. The public-key from the asymmetric key pair is used as the cryptographic identity of the entity, while the private-key from the asymmetric key pair is known only to the entity. The off-line generation of the root asymmetric key pairs protects the key pair from being compromised by a bad actor. Device keys can be generated online but may be stored in a hardware security module (HSM).

A cryptographic ID, such as a cryptographic device ID or cryptographic user ID, represents a single entity in the system, such as a device or a user, respectively. Consequently, the identity established using the cryptographic ID is globally distinct. In an embodiment, users are unique across teams even if no administrators distinguish them. Even between non-cooperating groups, such as teams that do not share any members, the identity established using the cryptographic ID remains globally distinct.

The cryptographic user IDs can be used to sign/authorize device keys which are used operationally in the system. Devices can use cryptographic device IDs, which can include three keys types: administrative signing keys, message signing keys, and device encryption key. All of these key types are asymmetric key pairs and can be managed outside of the application, in an operating system (OS) keys store or a hardware security module (HSM).

The identity certificate 600 can be deterministically generated from a recovery secret, allowing efficient hand transcription of the recovery secret when provisioning a new device.

The administrative signing key 610 can be used in high-risk operations and can require proof of user presence for any signing request. Examples of the high-risk operations are adding users or changing permissions.

The message signing key 620 can be used to sign most data transmitted by the device 110-160 in FIG. 1 and does not require proof of presence. An example use of the message signing key 620 is to sign messages sent in a chat, or to sign files to be uploaded.

The device encryption key 630 can be used when sending a confidential message to the device is necessary. The device encryption key 630 can be rotated often to provide for forward secrecy for device to device communications.

Figure 7:
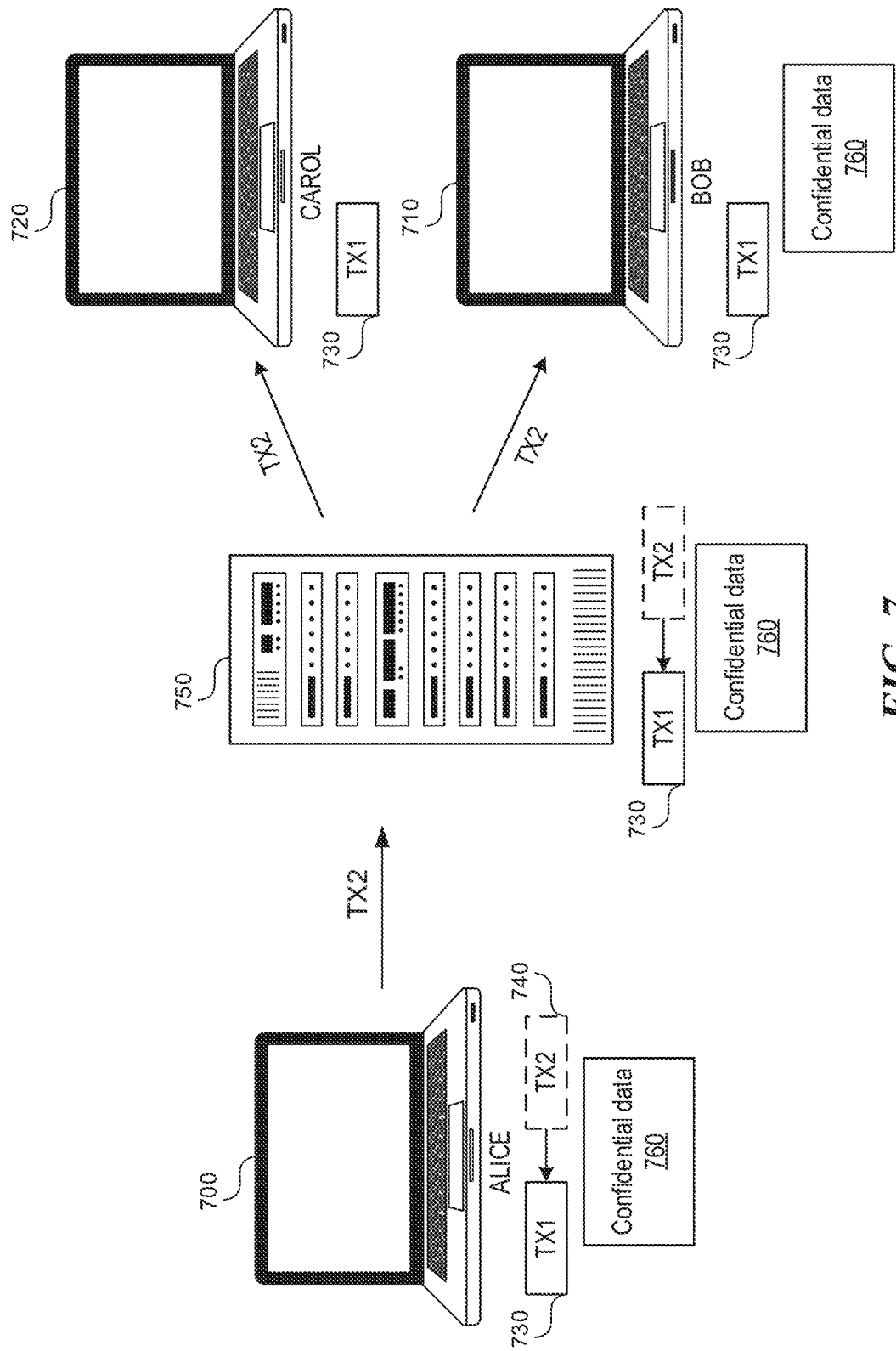
FIG. 7 shows how a block can be distributed to multiple devices.

FIG. 7 shows how a block can be distributed to multiple devices. Devices 700, 710, 720 can belong to the same space and/or team. They all can have a copy of the linear sequence 730. When one of the devices, such as device 700, adds a new block 740 to the linear sequence 700, the device 700 sends the new block 740 to the server 750.

The server 750 also has a copy of the linear sequence 730. The server 750 can compute whether the block 740 is valid by computing whether the user has the authority to perform the operation represented in the block 740. To determine whether the user has the authority, the server 750 can compute the authority from the linear sequence 730. The authority computation is explained below.

Once the server 750 verifies that the block is valid, the server can distribute the block 740 to the devices 710, 720, which in turn can also compute whether the block 740 is valid based on the authority recorded in the linear sequence 730. If the device 710, 720 determines that the block is not valid, the device can shut down because likely a breach of the system has occurred.

The devices 700, 710, 720 can share encrypted data 760, if they are in the same space. The encrypted data 760 is encrypted using at least one cryptographic key, such as a confidential session key, explained below. Different devices 700, 710, 720 can have different authority to the encrypted data 760 such as read-only, write-only, and read and write authority.

The server 750 can also store the encrypted confidential data 760, however the server 750 does not store any of the cryptographic keys, including the confidential session key. The server 750 does not have any authority to the encrypted data 760. The server 750 has a copy of the encrypted data 750 to ensure availability of the data. For example, if the devices 700, 710 are off-line, and the device 720, as a newly added member of the space, requests the encrypted confidential data 760, the server 750 can provide the encrypted confidential data 760 to the device 720, even if the devices 700, 710 are off-line.

Figure 8:
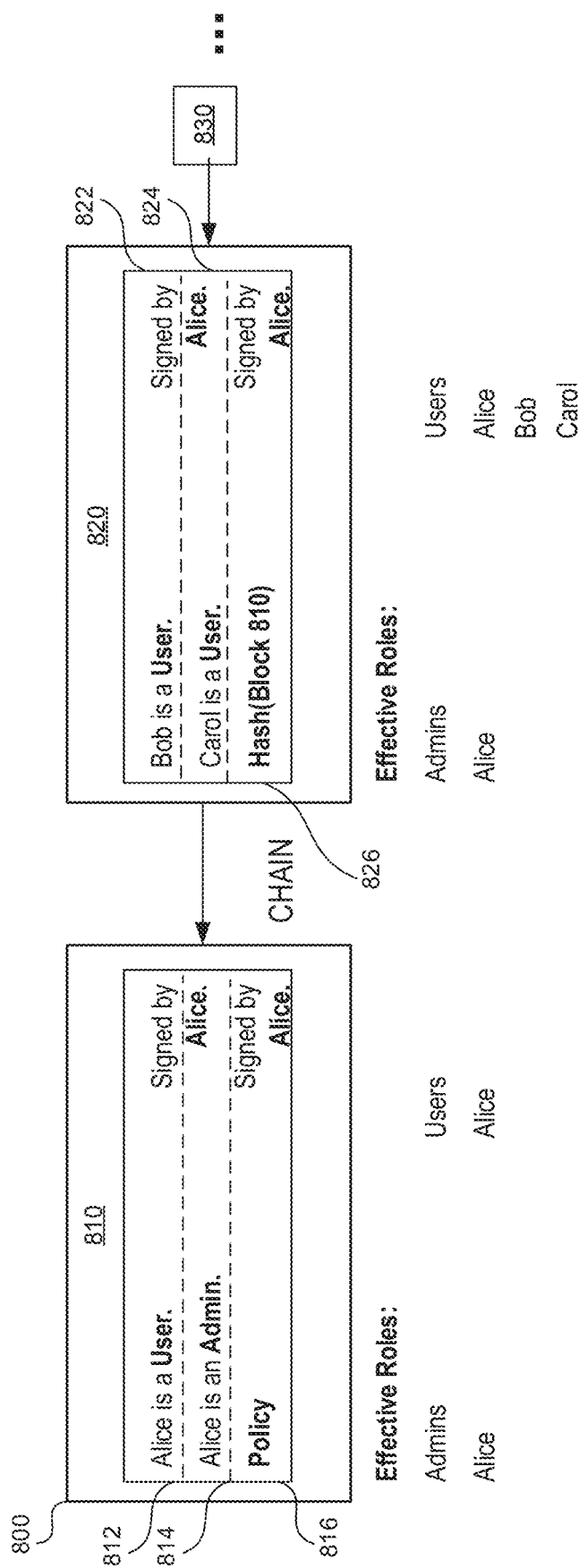
FIG. 8 shows a linear sequence containing blocks.

FIG. 8 shows a linear sequence containing blocks. The linear sequence 800 contains at least blocks 810, 820, 830. Block 810 contains multiple events 812, 814, while block 820 contains events 822, 824. Block 810 is the initial block in the linear sequence 800 and contains the policy 816 defining authority for the linear sequence 800. Each event in the subsequent blocks, such as block 820, can be verified to ensure that the event 822, 824 is consistent with the policy 816.

Each block subsequent to the initial block, such as block 820, includes the cryptographic hash 826 of the previous block, which for block 820 would be the hash of block 810. By including the cryptographic hash of the previous block, the ordering of the blocks in the linear sequence 800 can be guaranteed, and a reordering or editing of existing blocks, and/or an insertion of new blocks within the linear sequence 800 can be detected and automatically rejected.

The linear sequence 800 does not require a proof of work to verify the validity of the block, because the linear sequence 800 is a linear sequence, without any branching. Further, when a block is added to the list, the block's validity has been checked to comply with the policy and authority recorded in the linear sequence 800, and the block cannot be deleted. In other words, the order list 800 cannot be rolled back.

Within the initial block 810, event 812 establishes Alice as the user. The event is signed by Alice, meaning that Alice uses her private-key to encrypt the statement "Alice is a user." To verify that Alice is truly requesting to be established as a user, a processor can verify the signed statement "Alice is a user," using Alice's public-key and if verification succeeded the processor can know that Alice has truly requested to establish the user.

Event 814 establishes Alice as an administrator. Similarly, the event is signed and the processor can verify Alice's identity, as explained above. Because block 810 is the initial block, the policy 816 for the linear sequence is established. For example, policy 816 can state "only administrators can add users." Once block 810 has been committed to the linear sequence 800, the effective roles of the system are that Alice is an administrator and Alice is a user.

Event 822 in block 820 establishes that Bob is a user. To compute whether Alice has the authority to add the user, the processor can check the policy 816 and Alice's role in the system established by events 812, 814. Because the policy specifies that only administrators can add users, the processor checks whether Alice is an administrator. Upon verifying that Alice is an administrator, the processor can verify that Alice has the authority to add Bob as a user. Each event subsequent to the events contained in the initial block 812, 814, can be checked against the policy 816, and the policy authorizing the event can be recorded. For example, for event 822, block 820 can point to the policy stating that "only administrators can add users," and a processor can check that there is a fact stored in a fact database that "Alice is an administrator."

Event 824 adds Carol as a user and must also be signed by Alice, as explained above. Event 822 can also point to the policy that authorized the event, namely the policy stating "only administrators can add users" which is supported by the fact that "Alice is an administrator." The hash 826 creates a linear sequence of blocks 810, 820. After block 820 has been committed to the linear sequence 800, the effective roles in the system are that Alice is an administrator, and Alice, Bob, and Carol are users.

Other roles can be defined within the team such as legal, technical, sales etc. Each role can be granted access to a corresponding space type. For example, if Alice has role of "legal," Alice can be granted access to all spaces that have type "legal." If Alice's "legal" role is revoked, Alice can automatically lose access to the spaces that have type "legal."

Figure 9:
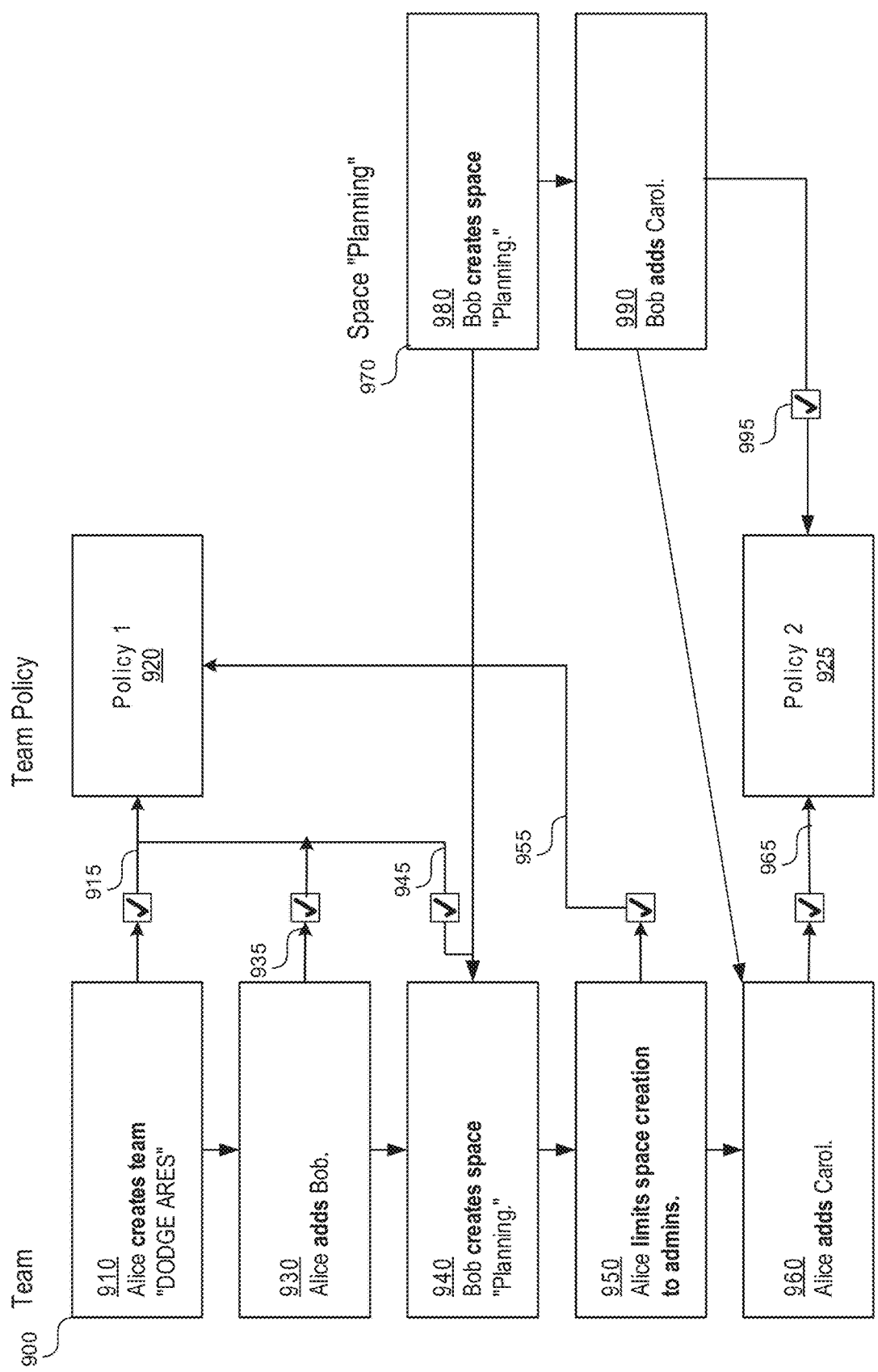
FIG. 9 shows a team linear sequence and a space linear sequence.

FIG. 9 shows a team linear sequence and a space linear sequence. In this example, the team linear sequence 900 and the block linear sequence contain blocks that include only one event. The team linear sequence 900 is initialized with the initial block 910 and using connection 915 linked to the policy 920, which establishes the policy for the team and any spaces. In block 930, Alice adds Bob as a user, and this event can be linked, using connection 935, to the policy 920 that authorizes it.

In block 940, Bob creates space "planning," and the event is linked to the policy 920 to ensure that Bob as the user has the authority to create a space. By default, only the creator of the space is granted administrative authority to the space on the space linear sequence 970. If policy 920 authorizes users to create spaces, the block 930 is validated, the event is linked using connection 945 to the policy 920, and the block 940 is added to the team linear sequence 900. When Bob creates space "planning," space linear sequence 970 is established, with the initial block 980 pointing to block 940 to indicate that the list was created after block 940, but before block 950, explained below.

In block 950, Alice limits space creation to administrators. This action changes the policy 920. To verify whether block 950 is valid, a processor needs to check the policy 920 to see if the policy allows administrators to modify the policy. If the policy 920 allows administrators to modify the policy, the event is linked, using connection 955, to a portion of policy 920 that allows administrators to modify the policy, and the new policy 925 is established. Even though after block 950, Bob cannot create a space, because Bob had the authority in block 942 to create the space, the space that Bob created is valid. In block 960, Alice adds Carol, and the event is checked against the new policy 925. Once the event is approved as authorized by the new policy 925, the connection 965 is established to that portion of the new policy 925 that authorizes the event.

In block 990 of the space linear sequence 970, Bob adds Carol as a user. To verify whether block 990 is valid, the processor needs to check the new policy 925 to see if policy 925 allows space users to add other space users. The policy 925 allows users to add users, and the event is linked, using connection 995, to a portion of the policy 925 that authorizes the event.

As explained earlier, only team members can be added to the space. If Bob attempts to add Carol prior to the block 950, the processor would not authorize the addition of the block 990, because after checking the fact base and/or the team linear sequence 900, the processor can determine that Carol is not a member of the team. However, if Bob attempts to add Carol to the space linear sequence 970 after block 960, the processor will authorize the addition of block 990, because the policy allows space users to add space users, and because Carol is a member of the team.

Figure 10A:
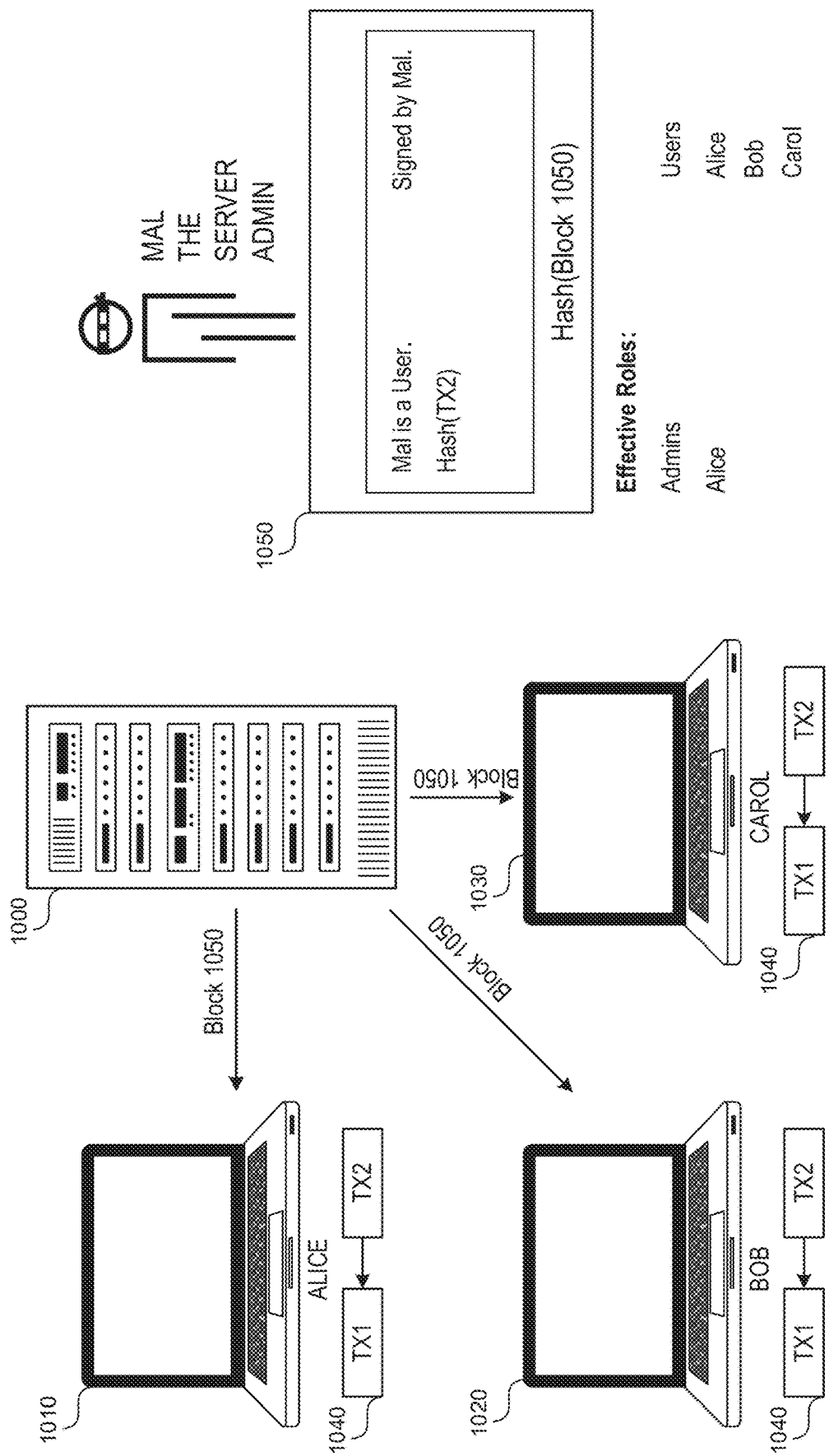
FIGS. 10A-B show authority computation in case a malicious actor tries to infiltrate the system.
Figure 10B:
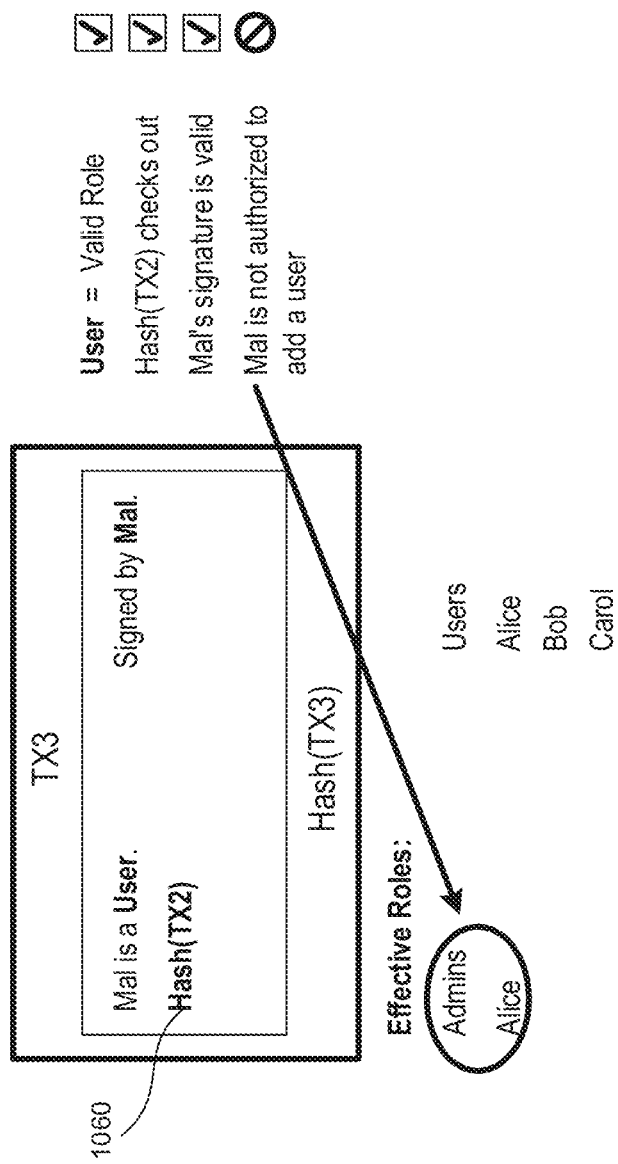

FIGS. 10A-B show authority computation in case a malicious actor tries to infiltrate the system. This example illustrates how a compromise of the server 1000 does not compromise the devices 1010, 1020, 1030 because each device 1010-1030 independently checks and guarantees a validity of the linear sequence 1040 and the authority recorded in the linear sequence 1040.

If the server 1000 is compromised, for example, by a malicious server administrator who coerces the server 1000 into incorrectly verifying and distributing a fraudulent block 1050 to the devices 1010-1030, each device 1010-1030 can independently verify the validity of the block 1050.

In FIG. 10B, each device 1010-1030 can independently verify that the hash 1060 of the last block in the linear sequence 1040 is valid. Each device 1010-1030 can verify that user is a valid role. Each device 1010-1030 can verify that Mal's signature is valid because, prior to submitting block 1050, Mal has requested that the server 1000 generate a public-key and a private-key for him and distribute the public-keys to the devices 1010-1030. However, the device 1010-1030 can determine that block 1050 is not valid because, according to system policy, only existing members, such as administrators or users, can add new users, and Mal is not an administrator or a user. Because the block 1050 does not satisfy policy, all the devices 1010-1030 can reject the block 1050. In addition, the devices 1010-1030 can shut down once an invalid transaction is received from the server 1000, because the devices 1010-1030 can conclude that the server 1000 has been compromised.

Figure 11A:
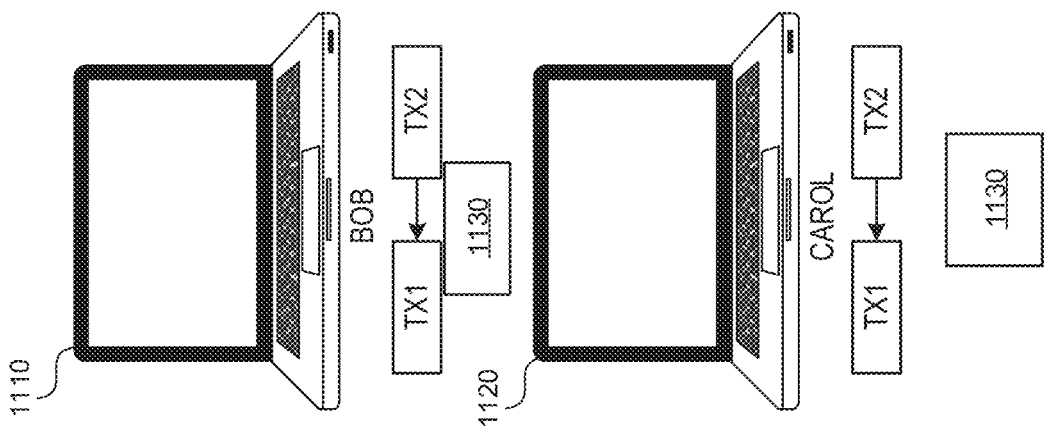
FIGS. 11A-C show how access to encrypted data can be controlled upon authority revocation.
Figure 11B:
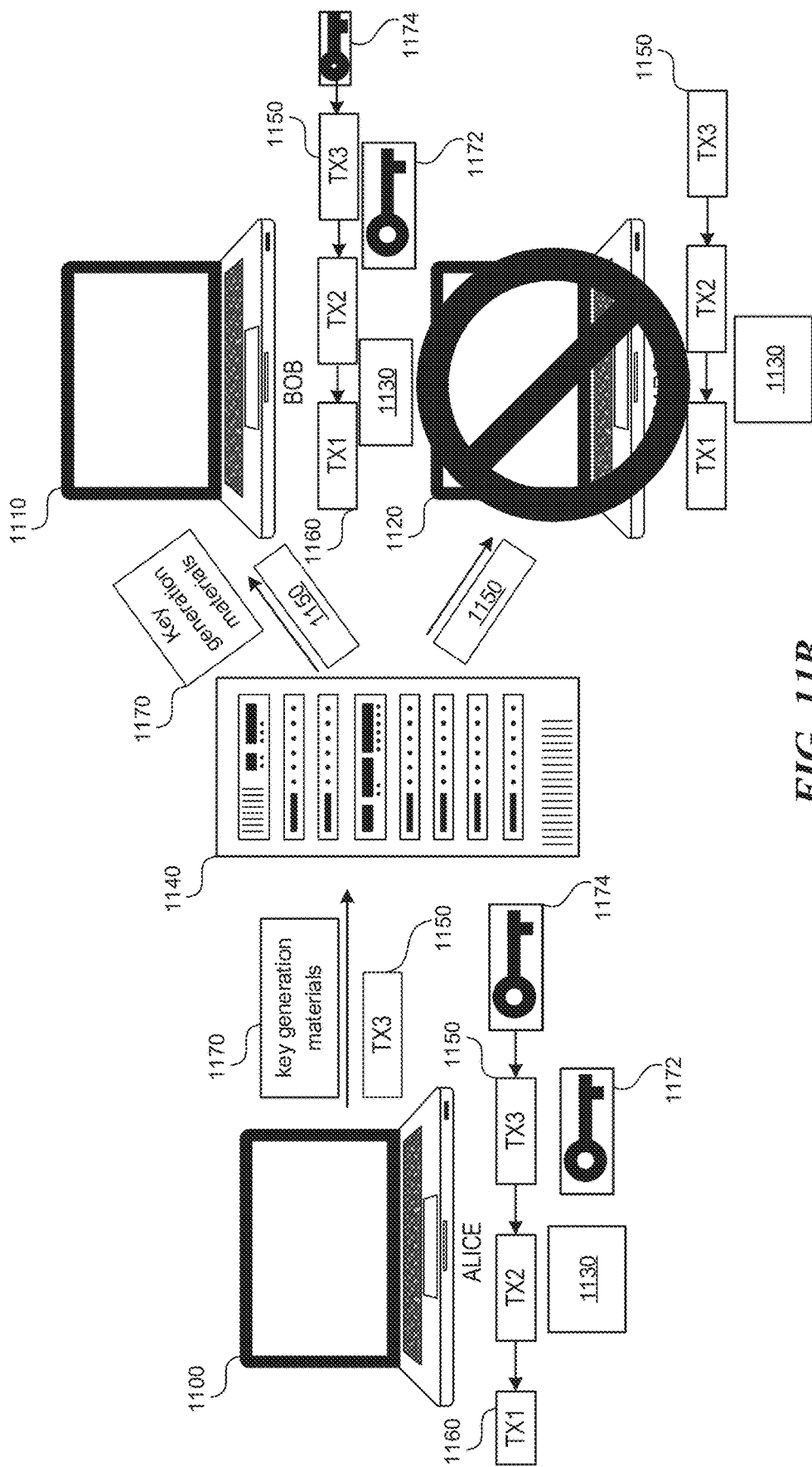
Figure 11C:
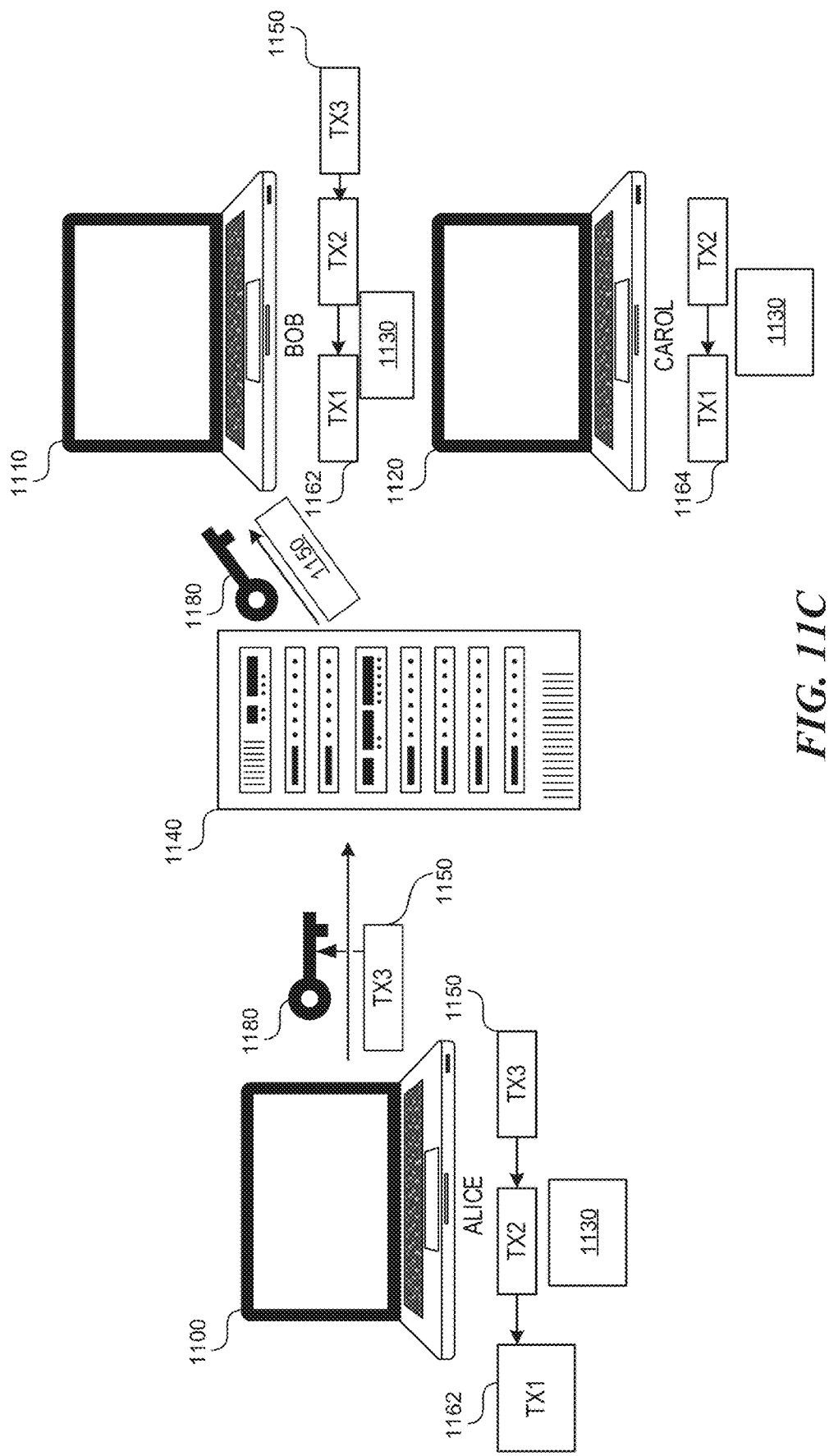

FIG. 11A-C show how access to encrypted data can be controlled upon authority revocation. Devices 1100, 1110, 1120 can share encrypted data 1130, by, for example, being part of the same space. The encrypted data 1130 can be encrypted using an Advanced Encryption Standard (AES), a symmetric-key algorithm using the same key for both encrypting and decrypting the data. The encrypted confidential data 1130 can be stored on the devices 1100-1120 and the server 1140. The AES key can be known only to the devices 1100-1120 that have the authority to access the encrypted data 1130.

Assuming Alice is an administrator and has the authority to remove users, Alice can submit a block 1150 to the server, that states "Carol is not a user," thus revoking Carol's authority to any future encrypted data shared between Alice and Bob. The server 1140 can distribute the block 1150 to all the devices 1110-1120, as seen in FIG. 11B.

Upon validation of the block 1150, by the devices 1110-1120, Carol and her device 1120 lose the authority to access any future encrypted data. To ensure that Carol and her device 1120 cannot access any future encrypted data shared between Alice and Bob, devices 1100, 1110 generate a new channel session key.

The new channel session key can be generated using the cryptographic methods such as elliptic curve cryptography, for example, using a P-384 elliptic curve. The channel session key can be generated using secret key generation materials 1170, such as domain parameters in the case of elliptic curve cryptography. The domain parameters can include the constants A, B defining the elliptic curve $Y^2=X^3+AX+B$.

The new group of devices that share the key is computed based on the linear sequence 1160. The secret key generation material 1170 is encrypted using each of the public-keys of an asymmetric cryptographic algorithm belonging to the devices remaining in the new group of devices. The encrypted secret key generation materials 1170 are distributed to all the devices in the group. The devices 1100, 1110 can use their own private-keys of the asymmetric cryptographic algorithm to decrypt the received encrypted message. As a result, only devices 1100, 1110 having the private key corresponding to the public-key used in encryption can calculate the new channel session key.

Devices 1100, 1110 receiving the secret key generation materials 1170 can compute a private portion 1172 of the channel session key and a public portion 1174 of the channel session key, and can record the public portion 1174 of the channel session key to the linear sequence 1160. As a result of committing the public portion 1174 of the channel session key to the linear sequence 1160, a client having an access to the linear sequence 1160 can access the public portion 1174 and have write-only access to the linear sequence 1160. The client cannot read any of the encrypted data associated with the linear sequence 1160, because the client does not have the secret key generation materials 1170 and/or the private portion 1172 of the channel session key. The private portion 1172 of the channel session key is not recorded in the linear sequence 1160.

Because the linear sequence 1160 does not require proof of work, and duplicating the linear sequence 1160 can be computationally feasible, a compromised server 1140 can present two different linear sequences 1162, 1164 to two groups of users, as seen in FIG. 11C. For example, the compromised server 1140 can refuse to distribute block 1150 to device 1120, thus leading the device 1120 to believe it is still in the group and to attempt to share encrypted data 1190 of device 1120 with devices 1100 and 1110. Consequently, a new channel session key 1180 can be computed based on the hash of the last block 1150 in the linear sequence 1160. For example, the new channel session key 1180 can be obtained by performing HKDF (channel session key in FIG. 11B, hash of block 1150). As a result, since devices 1100 and 1110 do not share the same last block with the device 1120, device 1120 cannot compute the same channel session key 1180.

In addition to the users of the same space Alice and Bob, a guest user can be temporarily granted access to the encrypted data contained in the same space as Alice and Bob. The guest user does not have access to the team linear sequence 1160 and cannot validate authority of a user within the space linear sequence 1160. However, the guest user can still negotiate a channel session key with Alice and Bob and be granted a temporary access to the encrypted data 1130.

Figure 12:
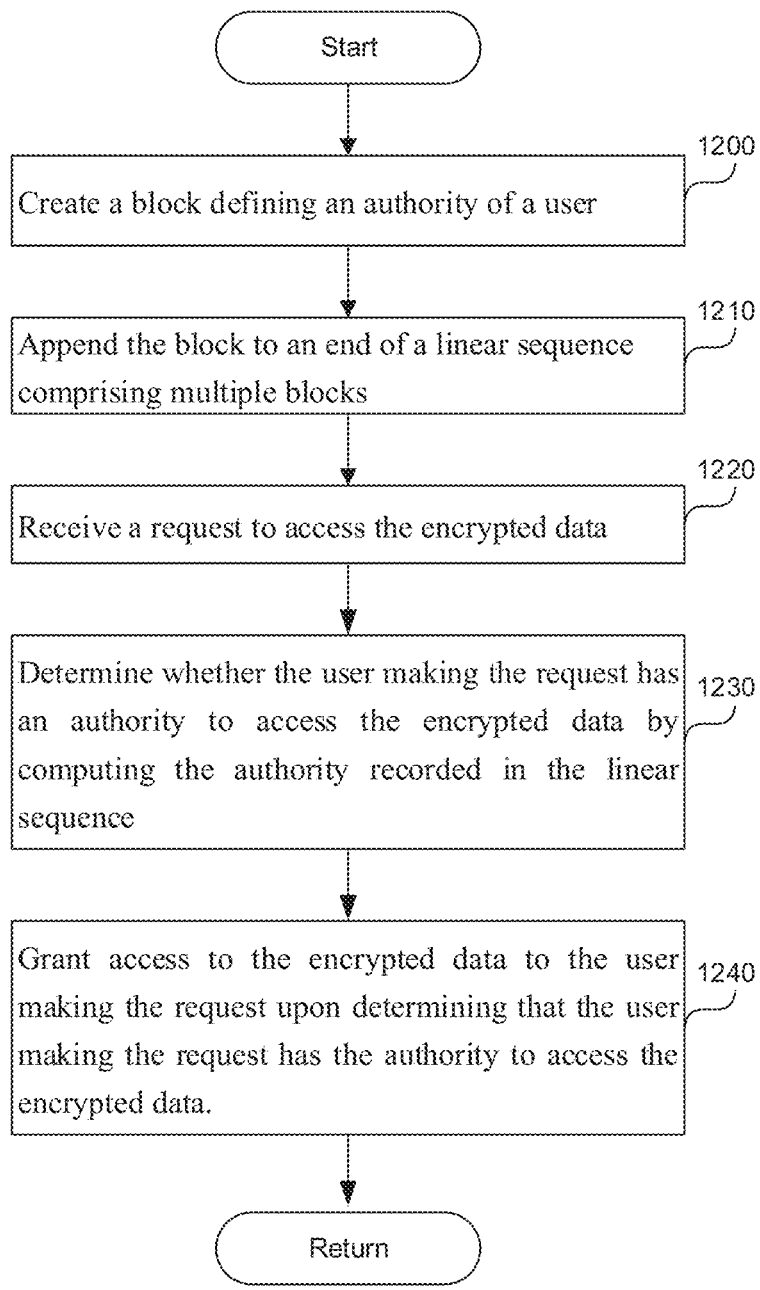
FIG. 12 is a flowchart of a method to manage authority, via a distributed ledger, separately from access to encrypted data by one or more trusted devices, wherein each of the trusted devices corresponds to at least one cryptographic key-based identity.

FIG. 12 is a flowchart of a method to manage, via a distributed ledger, authority separately from access to encrypted data by one or more trusted devices, wherein each of the trusted devices corresponds to at least one cryptographic key-based identity. In step 1200, a processor can create a block defining an authority of a user. The block can include a cryptographic user ID uniquely identifying the user and an authority associated with the cryptographic user ID. The authority can define at least an operation associated with the cryptographic user ID to perform on the encrypted data. The operation can include read-only, write-only, or read and write. Unlike a bitcoin ledger which requires approval to work, the block does not require an entry approving work, thus generation of the block is less processor intensive compared to bitcoin, which, on average, requires 10 minutes of processor time to generate a proof of work for the block.

In step 1210, the processor can append the block to an end of a linear sequence, including multiple blocks defining an authority associated with the encrypted data, and preserves a membership and an ordering of each block in the multiple blocks. To preserve the membership of the block, no block in the linear sequence can be deleted. In other words, deletion is not allowed operation on the linear sequence. To preserve ordering of each block among multiple blocks, rollbacks are not an allowed operation of the linear sequence. In other words, the linear sequence cannot branch, and contents of a block in the linear sequence cannot be modified and/or edited once the block is added to the linear sequence. The prohibition of deletion and modification of blocks ensures integrity of the linear sequence. In other words, once a block is added to the linear sequence, the block is permanently in the linear sequence. Further, before a block is added to the linear sequence, the contents of the block must be verified to ensure they are consistent with the preceding blocks in the linear sequence.

In step 1220, the processor can receive a request to access the encrypted data. The request can include a cryptographic user ID associated with the user making the request. Access to the encrypted data can include read-only, write-only, or both read and write access.

In step 1230, the processor can determine whether the user making the request has an authority to access the encrypted data by computing the authority recorded in the linear sequence as shown in FIGS. 8, 9, and 10A-B. To compute the authority, the processor can check the linear sequence from an initial block to a last block to determine user roles and authority associated with each role, and to compare the request from the user to the user role. In other words, the processor can manage access to the encrypted data by the cryptographic user ID by checking that the access by the cryptographic user ID is permitted by the authority recorded in the linear sequence.

In step 1240, the processor can grant access to the encrypted data to the user making the request upon determining that the user making the request has the authority to access the encrypted data.

The processor can create an initial block in the linear sequence defining a policy specifying a role and an authority associated with the role. For example, the initial block 810 in FIG. 8 defines policy 816 in FIG. 8. Further, the processor can create the block in the linear sequence defining a role associated with the cryptographic user ID. The block can be the initial block 810, as shown in FIG. 8 which, in addition to defining policy, defines that Alice is an administrator in event 814 in FIG. 8, or the block can be a subsequent block, such as block 820 in FIG. 8, which defines Bob and Carol as users.

To preserve the ordering of each block in the multiple blocks, the processor can include a cryptographic hash ("hash") of each previous block in each subsequent block, thus enabling detection of any change in the ordering sequence, as explained in FIG. 8. For example, the processor can compute a second cryptographic hash of data contained in a second block in the multiple blocks. The second block can be the initial block, or any block, in the linear sequence. The processor can store the second cryptographic hash within the second block, and can include the second cryptographic hash in data contained in a block subsequent to the second block.

To preserve the membership of blocks within the linear sequence, the processor can define a set of operations to be performed on the linear sequence, where any operation outside of the defined set cannot be performed in the linear sequence. The defined set can exclude operations such as deletion, branching of the linear sequence, and/or modification of data within the linear sequence.

To reduce the likelihood of a failure, such as corrupting the linear sequence and/or the encrypted data by a compromised central server, the processor can distribute the linear sequence to multiple devices. Each device in the multiple devices can be cryptographically verified by a cryptographic user ID associated with the linear sequence, as explained in FIG. 2. For example, to add a device to the list of authorized devices, an already authorized cryptographic user ID needs to request access for the device, as explained in FIG. 2. Upon receiving the request, the processor can verify that the cryptographic user ID indeed made the request by decrypting the request using the public-key of the cryptographic user ID. Upon verification, the processor can assign a cryptographic device ID to the device.

Each device among the multiple devices having the cryptographic device ID can independently verify the validity of a request based on the authority computed based on the linear sequence, as explained in FIGS. 10A-B. If a device cannot verify that the block is valid based on the computed authority, the device can refuse to add the block. Upon failure to verify, the device can shut down to prevent tampering with the encrypted data on the device.

The processor can define a team of cryptographic user IDs, for efficiency purposes, so that not all the cryptographic IDs have to be searched to find a group of people who can share encrypted data amongst themselves. To create the team, the processor can create a team linear sequence including multiple blocks. The multiple blocks can include one or more policy blocks, one or more profile blocks, and one or more authority blocks. The one or more policy blocks can define a policy establishing a role and an authority associated with the role, the one or more profile blocks can establish a cryptographic user ID and a cryptographic device ID associated with the cryptographic user ID, and the one or more authority blocks can define the role associated with the cryptographic user ID. The team linear sequence is an instance of, and has the same properties as, the linear sequence described in this application.

The policy recorded in the initial block of a linear sequence, such as the team linear sequence, can be modified if the policy recorded in the initial block permits modification. If the policy recorded in the initial block does not permit modification, any block attempting to modify the policy will not be verified by the multiple devices.

To modify the policy, the processor can obtain a request to modify the policy defined in the one or more policy blocks and a cryptographic ID of a user making the request. The processor can check whether the cryptographic user ID is authorized to modify the policy by determining authority associated with the cryptographic ID from the team linear sequence. Usually only administrators are allowed to modify the policy, and the processor can check whether the cryptographic user ID has a role of an administrator or a user. If the cryptographic user ID has the role of a user, the processor can refuse to verify the block. Upon determining that the cryptographic user ID is authorized, the processor can create a policy block specifying the modification and can append the policy block defining the modification to the end of the team linear sequence.

Once the processor defines the team, the processor can define a space within the team, which has a subset of the team members that can privately share encrypted data. The space membership can be the same as the team membership or can be smaller than the team membership. The space is a virtual compartment defining encrypted data and access to the encrypted data. The space can include the encrypted data using a cryptographic key known only to the members of the space.

To define the space the processor can represent the members and the encrypted data by creating a space linear sequence. For efficiency, the space linear sequence can be subdivided into multiple linear sequences. For example, the space linear sequence can be subdivided into an authority linear sequence, and the encrypted data linear sequence. The authority linear sequence can define a role within the space of the cryptographic user ID. The cryptographic user ID is a member of the space and the role is consistent with the policy defined in the one or more policy blocks of the team. The encrypted data linear sequence can record operations performed on the encrypted data such as addition, deletion or modification of at least a portion of the encrypted data.

The encrypted data can include multiple types of encrypted data such as files, emails, messages, etc. The processor can create a linear sequence for each of the encrypted data types. So, instead of creating one encrypted data linear sequence, the processor can create a linear sequence for the files, a linear sequence for the emails and a linear sequence for the messages.

By creating a separate linear sequences for authority and for each type of encrypted data, the processor can speed up the computation of authority because to compute the authority, the processor need only examine the linear sequence of blocks containing data pertaining to authority, as opposed to examining linear sequence containing authority blocks as well as encrypted data blocks. Assuming that there are as many authority blocks as encrypted data blocks, by splitting up the space linear list into the authority linear list and encrypted data linear list, the processor can speed up the computation of authority by a factor of two. Similarly, the processor can speed up retrieval of encrypted data by approximately a factor of 2, because to retrieve the encrypted data, the processor need only examine the encrypted data linear sequence, as opposed to linear sequence containing both encrypted data blocks and the authority blocks.

The processor can revoke membership of a cryptographic user ID associated with the space. When membership is revoked, the cryptographic user ID must be prevented from accessing and encrypted data shared within the space after the revocation of cryptographic user IDs membership. To prevent the cryptographic user ID from accessing encrypted data added to the space after the revocation, the processor can generate a cryptographic session key unknown to the cryptographic user ID whose membership has been revoked, and can encrypt the encrypted data added to the space after the revocation using the cryptographic session key. The data contained in space prior to the revocation can also be encrypted using the new cryptographic session key.

The new cryptographic session key can be an AES key computed using the following 4 steps. In step 1, the AES key can be computed using elliptic curve algorithm such as P-384. In step 2, the remaining group of devices is computed from the space linear sequence, for example, the authority linear sequence within the space. In step 3, the AES key is encrypted using a public device key of each device still in the space, and the encrypted AES key is distributed to each device within the space. Each device can decrypt encrypted AES key because each device knows its own private device key. Since no other devices know the private-key of the device, no eavesdroppers can decrypt the encrypted AES key. In step 4, a message encrypted using the AES key can be distributed to the devices within the space to ensure that everybody can decrypt the message.

In some instances, such as described in FIG. 11 C, the computation of the session key can include an additional step performed before step 3, in which the computation of the session key also includes a cryptographic hash of the last block in the space linear sequence, such as the authority linear sequence of the space. Specifically, once the AES key is computed in step 1, to generate the final key an additional step of combining the AES key and the cryptographic hash of the last block can be performed. The combination can be computed using the HKDF cryptographic function which takes his arguments the AES key and the cryptographic hash of the last block to produce the final key. The final key is then encrypted and distributed to all the devices.

In addition to computing the new session key once a member is removed from the list, the new session key can be computed when a new member is added, and the intent is to prevent the member from accessing the encrypted data shared within the space prior to the member joining.

The processor can enable a linear ordering of the team linear sequence in the space linear sequence by establishing a temporal relationship between multiple team blocks belonging to the team linear sequence and multiple space blocks belonging to the space linear sequence, as explained in FIG. 3. There can be various types of temporal relationships, such as a space block can be bound to a team block immediately preceding the space block, or the space block can be bound to a team block immediately succeeding the space block, etc. Establishing the linear order is important in authority computation as well as auditing.

For example, to determine the authority, reference needs to be made to the current policy defined in the team space at a time prior to the addition of the block. In another example, when performing auditing of the linear sequences, to determine whether a block was correctly added to a space linear sequence, the current authority needs to be computed which can be partially defined on the team linear sequence. To determine the current policy, a linear order of the blocks within the space linear sequence and the team linear sequence needs to be determined, so that the authority recorded in the team list prior to addition of a block can be computed.

Consequently, every time a block is added to the space linear sequence, the block is bound to the team linear sequence to determine the linear order between the team linear sequence and the space linear sequence. The linear order between two space linear sequences does not need to be established because the authority within the one space linear sequence does not affect the authority within the other space linear sequence.

Figure 13:
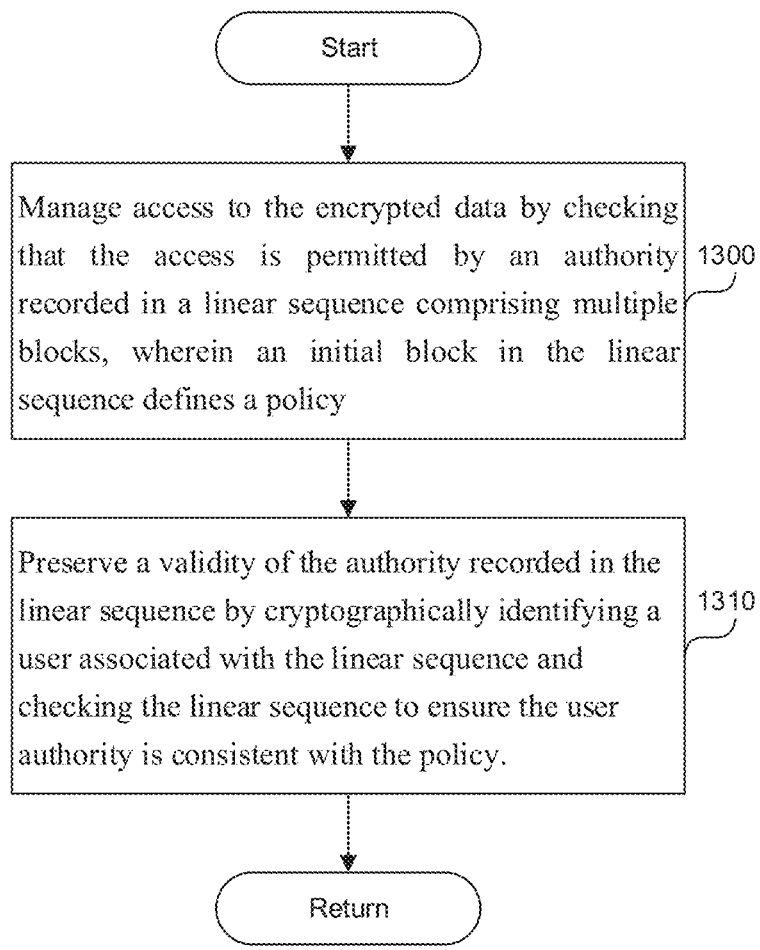
FIG. 13 is a flowchart of a method to manage access to encrypted data using a distributed ledger.

FIG. 13 is a flowchart of a method to manage access to encrypted data using a distributed ledger. In step 1300, a processor can manage access to the encrypted data by checking that the access is permitted by an authority recorded in a linear sequence including multiple blocks arranged, where an initial block in the linear sequence defines a policy specifying a role and an authority associated with the role.

In step 1310, the processor can preserve a validity of the authority recorded in the linear sequence by cryptographically identifying a user associated with the linear sequence, thus preventing an authorized user from accessing the linear sequence. Prior to adding a block associated with a user authority to the multiple blocks, the processor can check the linear sequence to ensure the user authority is consistent with the policy. Upon ensuring that the user authority is consistent with the policy, the processor can add the block associated with the user authority to the multiple blocks.

The processor can determine a user role associated with the user, an authority associated with the user role and can ensure the user authority associated with the block is within the limits of the authority associated with the user role.

For example, a block to be added to the sequence can request a modification of the policy. Prior to adding the block to the sequence, the processor can check whether the policy permits verification, and what role can modify the policy. For example, the policy can state that the policy can be modified but that only an administrator can modify the policy. If that is the case, the processor can check whether the user requesting modification is an administrator or not.

To prevent unauthorized access to the data by a compromised central server, the processor can distribute a linear sequence to multiple devices associated with multiple users, wherein each device in the multiple devices is cryptographically authenticated by a user in the multiple users. The determination whether to add a block to the linear sequence can be made independently by each of the devices, instead of being made by the central server, which creates a single point of failure.

The processor can authenticate each user using a cryptographic user ID, which can be a public-key generated using an asymmetric cryptographic algorithm. The cryptographic user ID can be a string of 2,048 bits. The asymmetric cryptographic algorithm can be RSA or DH, and can generate two keys, a public-key and a private-key. The processor can provide a first key (i.e., the private-key) in the asymmetric cryptographic key pair only to the user, and the cryptographic user ID (i.e., the public-key) in the asymmetric cryptographic key pair to multiple users into the whole system. The processor can use the public-key is a way to identify the user throughout the system. As a result, the user can assume different names in different teams or spaces, and the various names can be tied to one cryptographic user ID.

For example, to verify the user's identity, the processor can receive a text message and the text message can be signed using a private-key of the user. To verify the user's identity, the processor can use the user's public-key (i.e., the cryptographic user ID) to reverse the signing process. The processor can then compare the text message and the message obtained by reversing the signing process. If the text message and the message obtained by reversing the signing process are an exact match, the processor can verify the user's identity. Otherwise, the processor cannot verify the user's identity.

For efficiency purposes, the processor can create a team. To create a team the processor can obtain multiple cryptographic user IDs identifying multiple users. The processor can create the linear sequence comprising the multiple blocks arranged in the linear sequence, where the initial block in the linear sequence defines the policy specifying the role and the authority associated with the role, and where a block in the multiple blocks defines a role associated with a cryptographic user ID in the multiple cryptographic user IDs identifying a user in the multiple users.

To create a space within the team, the processor does not have to search all the cryptographic IDs in the system and can only search the cryptographic IDs contained in the team, thus preserving CPU cycles. For example, if a team contains 10 users, the whole system contains tens of thousands of users, the number of processor cycles used to create the space is reduced by approximately 1,000. The space can contain a subset of the cryptographic user IDs of the team. The space can include the data encrypted using a cryptographic key known only to the members of the space. The space can include a space linear sequence representing the members and the encrypted data.

As explained in this application, the space linear sequence can contain two or more sub-sequences for efficiency reasons. The space linear sequence can include an authority linear sequence containing blocks modifying the authority within the system, such as adding or removing users and/or administrators. Encrypted data linear sequence can include the linear sequence adding, deleting, and modifying encrypted data within the system. Encrypted data linear sequence can be further subdivided into multiple linear sequences depending on the type of the encrypted data, such as files and/or messages.

The team linear sequence, the space linear sequences, and the encrypted data can be stored in a memory configured to be continuously available to one or more computers over a network, such as the central server. So, in case most of the devices within the space are off-line, a device in the space can request encrypted data and/or can add a block to the space ordered sequence from the central server.

Computer

Figure 14:
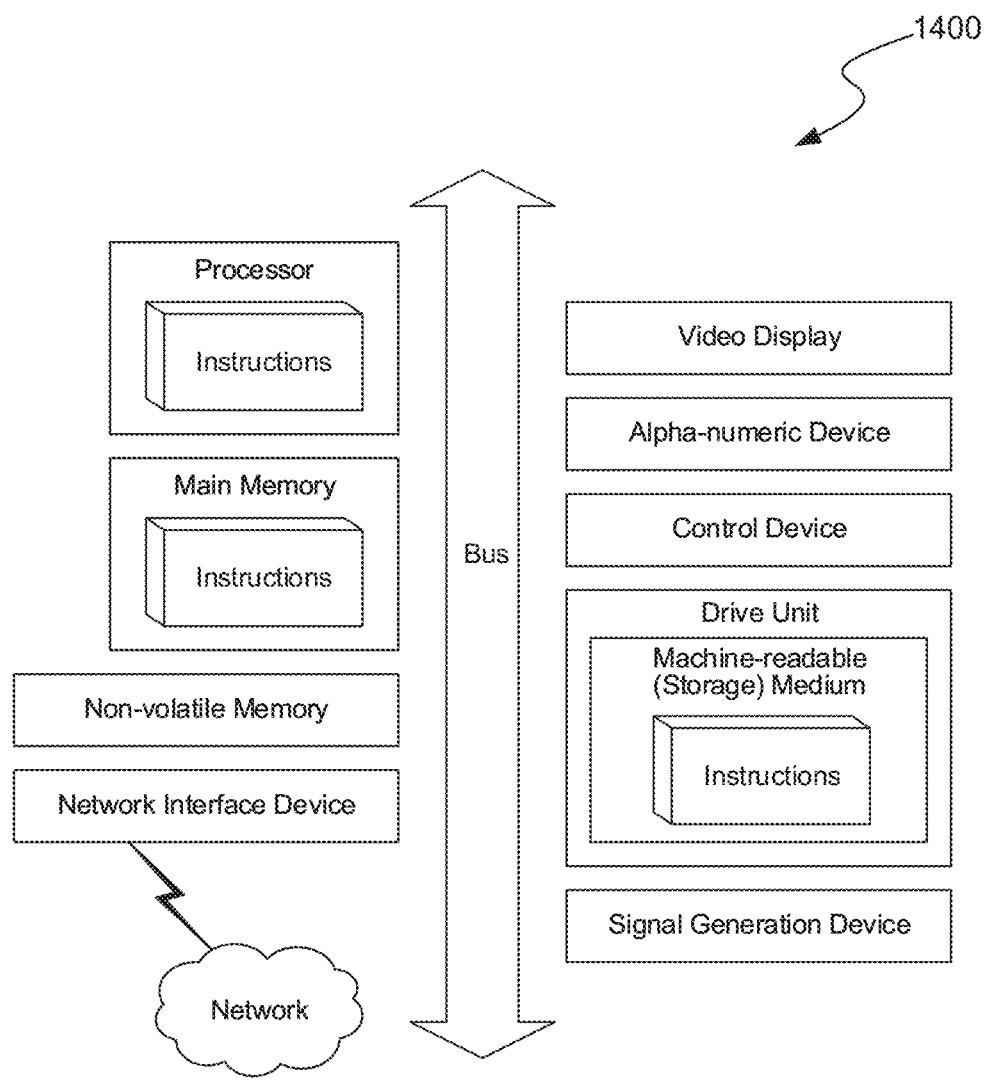
FIG. 14 is a diagrammatic representation of a machine in the example form of a computer system within which a set of instructions, for causing the machine to perform any one or more of the methodologies or modules discussed herein, may be executed.

FIG. 14 is a diagrammatic representation of a machine in the example form of a computer system 1400 within which a set of instructions, for causing the machine to perform any one or more of the methodologies or modules discussed herein, may be executed.

In the example of FIG. 14, the computer system 1400 includes a processor, memory, non-volatile memory, and an interface device. Various common components (e.g., cache memory) are omitted for illustrative simplicity. The computer system 1400 is intended to illustrate a hardware device on which any of the components described in the example of FIGS. 1-13 (and any other components described in this specification) can be implemented. The computer system 1400 can be of any applicable known or convenient type. The components of the computer system 1400 can be coupled together via a bus or through some other known or convenient device.

The computer system 1400 can represent the server such as 100 in FIG. 1, 750 in FIG. 7, 1000 and FIG. 10 A, 1140 in FIGS. 11 A-C. The computer system 1400 can represent the devices, such as 110-116 FIG. 1, 700-720 in FIG. 7, 1010-1030 in FIG. 10 A, 1100-1120 in FIGS. 11 A-11 C. The processor of the system 1400 can perform the various methods and instructions described in this application. The main memory, nonvolatile memory, and/or the drive unit of the system 1400 can store the instructions to be performed by the processor. The devices 1110-1160, 700-720, 1010-1030, 1100-1120, and the processor 100, 750, 1000, 1140 can communicate with each other using the network interface device of the system 1400.

This disclosure contemplates the computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1400 may include one or more computer systems 1400; be unitary or distributed; span multiple locations; span multiple machines; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1400. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 14 reside in the interface.

In operation, the computer system 1400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The language used in the specification has been principally selected for readability and instructional purposes, and it may not have been selected to delineate or circumscribe the inventive subject matter. It is, therefore, intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system comprising:
    at least one processor; and
    memory coupled to the at least one processor, the memory comprising computer executable instructions that, when executed by the at least one processor, performs a method comprising:
    managing access to encrypted data by checking that the access is permitted by an authority recorded in a linear sequence comprising a plurality of blocks wherein an initial block in the linear sequence defines a policy specifying a role and an authority associated with the role; and
    preserving a validity of the authority recorded in the linear sequence by:
    cryptographically identifying a user associated with the linear sequence,
    checking the linear sequence to ensure a user authority associated with a block is consistent with the policy by determining a user role associated with the user, the authority associated with the user role and ensuring the user authority associated with the block is within limits of the authority associated with the user role, and
    upon ensuring that the user authority is consistent with the policy, adding the block associated with the user authority to the plurality of blocks.

2. The system of claim 1, the processor performing the method comprising:

distributing the linear sequence to a plurality of devices associated with a plurality of users, wherein each device in the plurality of devices is cryptographically authenticated by a user in the plurality of users.

3. The system of claim 1, the processor performing the method comprising:

generating an asymmetric cryptographic key pair for the user;

providing a first key in the asymmetric cryptographic key pair only to the user, and a cryptographic user ID in the asymmetric cryptographic key pair to a plurality of users; and identifying the user using the cryptographic user ID in the asymmetric cryptographic key pair.

4. The system of claim 1, the processor performing the method comprising:

obtaining a plurality of cryptographic user IDs identifying a plurality of users; and creating the linear sequence comprising the plurality of blocks wherein the initial block in the linear sequence defines the policy specifying the role and the authority associated with the role, and wherein the block in the plurality of blocks defines a role associated with a cryptographic user ID in the plurality of cryptographic user IDs identifying the user in the plurality of users.

5. The system of claim 4, the processor performing the method comprising:

defining a space whose members are a subset of the plurality of cryptographic user IDs, the space comprising at least a portion of the encrypted data encrypted using a cryptographic key known only to the members of the space, said defining the space comprising representing the members and the encrypted data by creating a space linear sequence.

6. The system of claim 5, the computer executable instructions creating the space linear sequence comprising:

creating an authority linear sequence defining the role associated with the cryptographic user ID in the subset of the plurality of cryptographic user IDs, wherein the role is consistent with the policy defined in the linear sequence; and creating one or more encrypted data linear sequences based on a type of the encrypted data, the one or more encrypted data linear sequences recording operations performed on the encrypted data comprising addition, deletion, or modification of at least a part of the encrypted data.

7. The system of claim 5, the processor performing the method comprising:

revoking a membership of the cryptographic user ID in the subset of the plurality of cryptographic user IDs;

preventing the cryptographic user ID whose membership has been revoked from accessing encrypted data added to the space after the revocation by generating a cryptographic session key unknown to the cryptographic user ID whose membership has been revoked; and encrypting the encrypted data added to the space after the revocation using the cryptographic session key.

8. The system of claim 7, the computer executable instructions generating the cryptographic session key comprising:

generating a cryptographic hash of a last block in the space linear sequence; and generating the cryptographic session key by combining the cryptographic hash of the last block and the cryptographic session key unknown to the cryptographic user ID whose membership has been revoked.

9. The system of claim 5, the processor performing the method comprising:

enabling a creation of a linear order between the linear sequence and the space linear sequence by establishing a temporal relationship between the plurality of blocks belonging to the linear sequence and a plurality of space blocks belonging to the space linear sequence.

10. The system of claim 1, the processor performing the method comprising:

enabling availability of the linear sequence by storing a copy of the linear sequence in a memory configured to be continuously available to one or more computers over a network.

11. At least one computer-readable storage medium, excluding transitory signals and carrying instructions that, when executed by at least one processor, perform a method comprising:

managing access to encrypted data by checking that the access is permitted by an authority recorded in a linear sequence comprising a plurality of blocks wherein an initial block in the linear sequence defines a policy specifying a role and an authority associated with the role; and preserving a validity of the authority recorded in the linear sequence by:

cryptographically identifying a user associated with the linear sequence, checking the linear sequence to ensure a user authority associated with a block is consistent with the policy by determining a user role associated with the user, the authority associated with the user role and ensuring the user authority associated with the block is within limits of the authority associated with the user role, and upon ensuring that the user authority is consistent with the policy, adding the block associated with the user authority to the plurality of blocks.

12. The storage medium of claim 11, the instructions performing the method comprising:

distributing the linear sequence to a plurality of devices associated with a plurality of users, wherein each device in the plurality of devices is cryptographically authenticated by a user in the plurality of users.

13. The storage medium of claim 11, the instructions performing the method comprising:

generating an asymmetric cryptographic key pair for the user;

providing a first key in the asymmetric cryptographic key pair only to the user, and a cryptographic user ID in the asymmetric cryptographic key pair to a plurality of users; and identifying the user using the cryptographic user ID in the asymmetric cryptographic key pair.

14. The storage medium of claim 11, the instructions performing the method comprising:

obtaining a plurality of cryptographic user IDs identifying a plurality of users; and creating the linear sequence comprising the plurality of blocks wherein the initial block in the linear sequence defines the policy specifying the role and the authority associated with the role, and wherein the block in the plurality of blocks defines a role associated with a cryptographic user ID in the plurality of cryptographic user IDs identifying the user in the plurality of users.

15. The storage medium of claim 14, the instructions performing the method comprising:

defining a space whose members are a subset of the plurality of cryptographic user IDs, the space comprising at least a portion of the encrypted data encrypted using a cryptographic key known only to the members of the space, said defining the space comprising representing the members and the encrypted data by creating a space linear sequence.

16. The storage medium of claim 15, the instructions creating the space linear sequence comprising the instructions performing the method comprising:
creating an authority linear sequence defining the role associated with the cryptographic user ID in the subset of the plurality of cryptographic user IDs, wherein the role is consistent with the policy defined in the linear sequence; and
creating one or more encrypted data linear sequences based on a type of the encrypted data, the one or more encrypted data linear sequences recording operations performed on the encrypted data comprising addition, deletion, or modification of at least a part of the encrypted data.

17. The storage medium of claim 15, the instructions performing the method comprising:
revoking a membership of the cryptographic user ID in the subset of the plurality of cryptographic user IDs;
preventing the cryptographic user ID whose membership has been revoked from accessing encrypted data added to the space after the revocation by generating a cryptographic session key unknown to the cryptographic user ID whose membership has been revoked; and
encrypting the encrypted data added to the space after the revocation using the cryptographic session key.

18. The storage medium of claim 17, the instructions generating the cryptographic session key comprising the instructions performing the method comprising:
generating a cryptographic hash of a last block in the space linear sequence; and
generating the cryptographic session key by combining the cryptographic hash of the last block and the cryptographic session key unknown to the cryptographic user ID whose membership has been revoked.

19. The storage medium of claim 15, the instructions performing the method comprising:
enabling a creation of a linear order between the linear sequence and the space linear sequence by establishing a temporal relationship between the plurality of blocks belonging to the linear sequence and a plurality of space blocks belonging to the space linear sequence.

20. The storage medium of claim 11, the instructions performing the method comprising:
enabling availability of the linear sequence by storing a copy of the linear sequence in a memory configured to be continuously available to one or more computers over a network.

21. A method comprising:
managing access to encrypted data by checking that the access is permitted by an authority recorded in a linear sequence comprising a plurality of blocks wherein an initial block in the linear sequence defines a policy specifying a role and an authority associated with the role; and
preserving a validity of the authority recorded in the linear sequence by:
cryptographically identifying a user associated with the linear sequence, checking the linear sequence to ensure a user authority associated with a block is consistent with the policy by determining a user role associated with the user, the authority associated with the user role and ensuring the user authority associated with the block is within limits of the authority associated with the user role, and
upon ensuring that the user authority is consistent with the policy, adding the block associated with the user authority to the plurality of blocks.

22. The method of claim 21, comprising:
distributing the linear sequence to a plurality of devices associated with a plurality of users, wherein each device in the plurality of devices is cryptographically authenticated by a user in the plurality of users.

23. The method of claim 21, comprising:
generating an asymmetric cryptographic key pair for the user;
providing a first key in the asymmetric cryptographic key pair only to the user, and a cryptographic user ID in the asymmetric cryptographic key pair to a plurality of users; and
identifying the user using the cryptographic user ID in the asymmetric cryptographic key pair.

24. The method of claim 21, comprising:
obtaining a plurality of cryptographic user IDs identifying a plurality of users; and
creating the linear sequence comprising the plurality of blocks wherein the initial block in the linear sequence defines the policy specifying the role and the authority associated with the role, and wherein the block in the plurality of blocks defines a role associated with a cryptographic user ID in the plurality of cryptographic user IDs identifying the user in the plurality of users.

25. The method of claim 24, comprising:
defining a space whose members are a subset of the plurality of cryptographic user IDs, the space comprising at least a portion of the encrypted data encrypted using a cryptographic key known only to the members of the space, said defining the space comprising representing the members and the encrypted data by creating a space linear sequence.

26. The method of claim 25, wherein the creating the space linear sequence comprises:
creating an authority linear sequence defining the role associated with the cryptographic user ID in the subset of the plurality of cryptographic user IDs, wherein the role is consistent with the policy defined in the linear sequence; and
creating one or more encrypted data linear sequences based on a type of the encrypted data, the one or more encrypted data linear sequences recording operations performed on the encrypted data comprising addition, deletion, or modification of at least a part of the encrypted data.

27. The method of claim 25, comprising:
revoking a membership of the cryptographic user ID in the subset of the plurality of cryptographic user IDs;
preventing the cryptographic user ID whose membership has been revoked from accessing encrypted data added to the space after the revocation by generating a cryptographic session key unknown to the cryptographic user ID whose membership has been revoked; and
encrypting the encrypted data added to the space after the revocation using the cryptographic session key.

28. The method of claim 27, wherein the generating the cryptographic session key comprises:
generating a cryptographic hash of a last block in the space linear sequence; and
generating the cryptographic session key by combining the cryptographic hash of the last block and the cryptographic session key unknown to the cryptographic user ID whose membership has been revoked.

29. The method of claim 25, comprising:
enabling a creation of a linear order between the linear sequence and the space linear sequence by establishing a temporal relationship between the plurality of blocks belonging to the linear sequence and a plurality of space blocks belonging to the space linear sequence.

30. The method of claim 21, comprising:
enabling availability of the linear sequence by storing a copy of the linear sequence in a memory configured to be continuously available to one or more computers over a network.

* * * * *